United States Patent
Gao et al.

(10) Patent No.: US 11,715,224 B2
(45) Date of Patent: Aug. 1, 2023

(54) THREE-DIMENSIONAL OBJECT RECONSTRUCTION METHOD AND APPARATUS

(71) Applicant: TENCENT TECHNOLOGY (SHENZHEN) COMPANY LIMITED, Guangdong (CN)

(72) Inventors: Yuan Gao, Shenzhen (CN); Xiang Kai Lin, Shenzhen (CN); Lin Chao Bao, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 226 days.

(21) Appl. No.: 17/242,415

(22) Filed: Apr. 28, 2021

(65) Prior Publication Data

US 2021/0248763 A1  Aug. 12, 2021

Related U.S. Application Data

(63) Continuation of application No. PCT/CN2020/079439, filed on Mar. 16, 2020.

(30) Foreign Application Priority Data

Mar. 26, 2019  (CN) .......................... 201910233202.3

(51) Int. Cl.
 *G06T 7/55* (2017.01)
 *G06T 7/33* (2017.01)
 (Continued)

(52) U.S. Cl.
 CPC ................ *G06T 7/55* (2017.01); *G06T 7/337* (2017.01); *G06V 10/25* (2022.01); *G06V 10/76* (2022.01);
 (Continued)

(58) Field of Classification Search
 CPC combination set(s) only.
 See application file for complete search history.

(56) References Cited

U.S. PATENT DOCUMENTS 9,299,195 B2    3/2016  Dou et al.
2013/0273968 A1*  10/2013  Rhoads .................. H04W 4/50
                                                            455/566
(Continued)

FOREIGN PATENT DOCUMENTS

CN     102831382 A     12/2012
CN     103824049 A      5/2014
(Continued)

OTHER PUBLICATIONS

Felix Endres et al., "An Evaluation of the RGB-D SLAM System", 2012 IEEE International Conference on Robotics and Automation, 2012, pp. 1691-1696 (6 pages total).

(Continued)

*Primary Examiner* — Zhiyu Lu
(74) *Attorney, Agent, or Firm* — Sughrue Mion, PLLC

(57) ABSTRACT

A three-dimensional object reconstruction method, applied to a terminal device or a server, is provided. The method includes obtaining a plurality of video frames of an object; determining three-dimensional location information of key points of the object in the plurality of video frames and physical meaning information of the key points, the physical meaning information indicating respective positions of the object; determining a correspondence between the key points having the same physical meaning information in the plurality of video frames; and generating a three-dimensional object according to the correspondence and the three-dimensional location information of the key points.

17 Claims, 14 Drawing Sheets

(51) Int. Cl.
  *G06V 40/16* (2022.01)
  *G06V 10/25* (2022.01)
  *G06V 10/75* (2022.01)
  *G06V 10/80* (2022.01)
  *G06V 10/82* (2022.01)
  *G06V 20/64* (2022.01)

(52) U.S. Cl.
  CPC ............ *G06V 10/803* (2022.01); *G06V 10/82* (2022.01); *G06V 20/653* (2022.01); *G06V 40/162* (2022.01); *G06V 40/164* (2022.01); *G06V 40/169* (2022.01); *G06V 40/171* (2022.01); *G06T 2207/10028* (2013.01)

(56) References Cited

U.S. PATENT DOCUMENTS

| | | |
|---|---|---|
| 2014/0003705 A1 | 1/2014 | Taguchi et al. |
| 2014/0028850 A1* | 1/2014 | Keating ............... A63F 13/428 348/158 |
| 2014/0119598 A1* | 5/2014 | Ramachandran .. G01C 21/3863 382/172 |
| 2014/0226864 A1* | 8/2014 | Venkatraman ......... G01C 21/20 382/107 |
| 2016/0066150 A1* | 3/2016 | Chao ...................... H04W 4/70 455/456.1 |
| 2016/0239950 A1* | 8/2016 | Miyasa ................... G06T 7/337 |
| 2016/0277645 A1* | 9/2016 | Bitouk ................ G06V 10/764 |
| 2016/0314585 A1* | 10/2016 | Thomas ................ G06V 40/10 |
| 2016/0360081 A1 | 12/2016 | Tsubaki |
| 2018/0268256 A1 | 9/2018 | Di Febbo et al. |

FOREIGN PATENT DOCUMENTS

| | | |
|---|---|---|
| CN | 106204718 A | 12/2016 |
| CN | 109005409 A | 12/2018 |
| CN | 109472820 A | 3/2019 |
| CN | 109949412 A | 6/2019 |

OTHER PUBLICATIONS

Extended European Search Report dated Apr. 20, 2022 in European Application No. 20778649.2.
Written Opinion of the International Searching Authority dated Jun. 19, 2020 in International Application No. PCT/CN2020/079439.
International Search Report for PCT/CN2020/079439 dated Jun. 19, 2020 (PCT/ISA/210).

* cited by examiner

THREE-DIMENSIONAL OBJECT RECONSTRUCTION METHOD AND APPARATUS

CROSS-REFERENCE TO RELATED APPLICATION(S)

This application is a bypass continuation application of International Application No. PCT/CN2020/079439, filed on Mar. 16, 2020, which claims priority to Chinese Patent Application No. 201910233202.3, entitled "THREE-DIMENSIONAL OBJECT RECONSTRUCTION METHOD AND APPARATUS" and filed on Mar. 26, 2019, the disclosures of which are herein incorporated by reference in their entireties.

FIELD

The disclosure relates to the field of data processing, and in particular, to a three-dimensional object reconstruction method and apparatus.

BACKGROUND

Three-dimensional technologies such as three-dimensional face recognition, three-dimensional liveness detection, three-dimensional face slimming and beautification receive wider attention. Compared with the conventional two-dimensional technologies, three-dimensional technologies can be used to perform a three-dimensional reconstruction of an object such as a human face or a thing, thereby providing better object detection and recognition effects and stronger safety. For example, three-dimensional human face technologies provide detection and recognition services by operating on a reconstructed three-dimensional human face. Three-dimensional object reconstruction technologies are the basis of all the three-dimensional technologies and directly affect the performance of subsequent tasks.

In the conventional three-dimensional object reconstruction method, video frames of a video including an object are obtained, and point cloud data in each video frame is obtained. Point cloud data in a video frame is a set of data reflecting feature points on the surface of the object in the video frame. Then a three-dimensional object is reconstructed by registration and fusion of the point cloud data of the video frames.

When point cloud data registration is performed, a large number of cyclic, iterative computations are required. This method not only requires a large amount of computation, but also has low accuracy, resulting in a poor three-dimensional object reconstruction effect.

SUMMARY

Example embodiments of the disclosure provide methods and apparatuses for three-dimensional object reconstruction. According to a correspondence between key points and three-dimensional location information of key points, point cloud data registration in a plurality of video frames is performed effectively, which not only reduces the amount of computation, but also has high accuracy, achieving a better three-dimensional object reconstruction effect.

According to an aspect of an example embodiment of the disclosure, provided is a three-dimensional object reconstruction method, applied to a terminal device or a server, the method including:

obtaining a plurality of video frames on object, each of the plurality of video frames comprises a color video subframe and a depth video subframe;

determining key point information of the object in the plurality of video frames according to color video subframes of the plurality of video frames, the key point information comprising two-dimensional location information of key points of the object and physical meaning information of the key points, the physical meaning information indicating respective positions of the object;

determining three-dimensional location information of the key points of the object in the plurality of video frames from depth video subframes of the plurality of video frames according to the two-dimensional location information of the key points.

determining a correspondence between the key points having the same physical meaning information in the plurality of video frames; and performing registration of point cloud data in the plurality of video frames according to the correspondence and the three-dimensional location information of the key points, and generating the three-dimensional object based on the registration of the point cloud data.

According to an aspect of an example embodiment of the disclosure, provided is a three-dimensional object reconstruction apparatus, including:

at least one memory configured to store program code; and at least one processor configured to read the program code and operate as instructed by the program code, the program code including:

video frame obtaining code configured to cause the at least one processor to obtain a plurality of video frames on object, each of the plurality of video frames comprises a color video subframe and a depth video subframe;

first determining code configured to cause the at least one processor to determine key point information of the object in the plurality of video frames according to color video subframes of the plurality of video frames, the key point information comprising two-dimensional location information of key points of the object and physical meaning information of the key points, the physical meaning information indicating respective positions of the object;

second determining code configured to cause the at least one processor to determine three-dimensional location information of the key points of the object in the plurality of video frames from depth video subframes of the plurality of video frames according to the two-dimensional location information of the key points.

third determining code configured to cause the at least one processor to determine a correspondence between the key points having the same physical meaning information in the plurality of video frames; and registration code configured to cause the at least one processor to perform registration of point cloud data in the plurality of video frames according to the correspondence and the three-dimensional location information of the key points, and generate the three-dimensional object based on the registration of the point cloud data.

According to an aspect of an example embodiment of the disclosure, provided is a three-dimensional object reconstruction method, applied to a terminal device or a server, the method including:

obtaining a plurality of video frames of an object;

determining three-dimensional location information of key points of the object in the plurality of video frames and physical meaning information of the key points, the physical meaning information indicating respective positions of the object;

determining a correspondence between the key points having the same physical meaning information in the plurality of video frames; and generating a three-dimensional object according to the correspondence and the three-dimensional location information of the key points.

According to an aspect of an example embodiment of the disclosure, provided is a three-dimensional object reconstruction apparatus, including:

at least one memory configured to store program code; and at least one processor configured to read the program code and operate as instructed by the program code, the program code including:

video frame obtaining code configured to cause the at least one processor to obtain a plurality of video frames of an object;

first determining code configured to cause the at least one processor to determine three-dimensional location information of key points of the object in the plurality of video frames and physical meaning information of the key points, the physical meaning information indicating respective positions of the object;

second determining code configured to cause the at least one processor to determine a correspondence between the key points having the same physical meaning information in the plurality of video frames; and generation code configured to cause the at least one processor to generate a three-dimensional object according to the correspondence and the three-dimensional location information of the key points.

According to an aspect of an example embodiment of the disclosure, provided is a three-dimensional object reconstruction device, including a processor and a memory, the memory being configured to store program code and transmit the program code to the processor; and the processor being configured to perform the three-dimensional object reconstruction method according to the first aspect or the third aspect according to instructions in the program code.

According to an aspect of an example embodiment of the disclosure, provided is a computer-readable storage medium, configured to store program code, the program code being used for performing the three-dimensional object reconstruction method according to the first aspect or the third aspect.

BRIEF DESCRIPTION OF THE DRAWINGS

To describe the technical solutions in the embodiments of the disclosure or existing technologies more clearly, the following briefly describes the accompanying drawings required for describing the embodiments or existing technologies. Apparently, the accompanying drawings in the following description show only some embodiments of the disclosure, and a person of ordinary skill in the art may derive other drawings from the accompanying drawings without creative efforts.

DETAILED DESCRIPTION

The following describes the embodiments of the disclosure with reference to accompanying drawings.

In a conventional three-dimensional object reconstruction method, a correspondence between feature points in point cloud data of different video frames is not known. For example, it is difficult to determine a feature point in one video frame corresponds to which feature point in another video frame. Therefore, when point cloud data registration is performed, a large number of cyclic, iterative computations are required for determining a correspondence between two groups of feature points. This method not only requires a large amount of computation, but also has low accuracy, resulting in a poor three-dimensional object reconstruction effect.

The embodiments of the disclosure provide a three-dimensional object reconstruction method. The three-dimensional object reconstruction method may be applied to an image processing device. The image processing device may be, for example, a server or a terminal device.

If the three-dimensional object reconstruction method is applied to a server, and the server is a device configured to provide services such as three-dimensional face recognition, three-dimensional liveness detection, and three-dimensional face slimming and beautification for a terminal device, the terminal device may upload an acquired video including an object to the server. The server obtains a three-dimensional object by using the three-dimensional object reconstruction method provided in the embodiments of the disclosure, and performs a next operation by using the three-dimensional object, so as to provide services for the terminal device. The server may be an independent server or a server in a cluster.

If the three-dimensional object reconstruction method is applied to a terminal device, the terminal device obtains a three-dimensional object by using the three-dimensional object reconstruction method provided in the embodiments of the disclosure, and uploads the three-dimensional object to a server for a next operation, so that the server may provide services for the terminal device. The terminal device may be, for example, a device such as a smart terminal, a computer, a personal digital assistant (PDA), a tablet computer or the like.

For ease of understanding of the technical solutions provided in the embodiments of the disclosure, the three-dimensional object reconstruction method provided in the embodiments of the disclosure is described below with reference to an actual application scenario by using a terminal device as an example.

Figure 1:
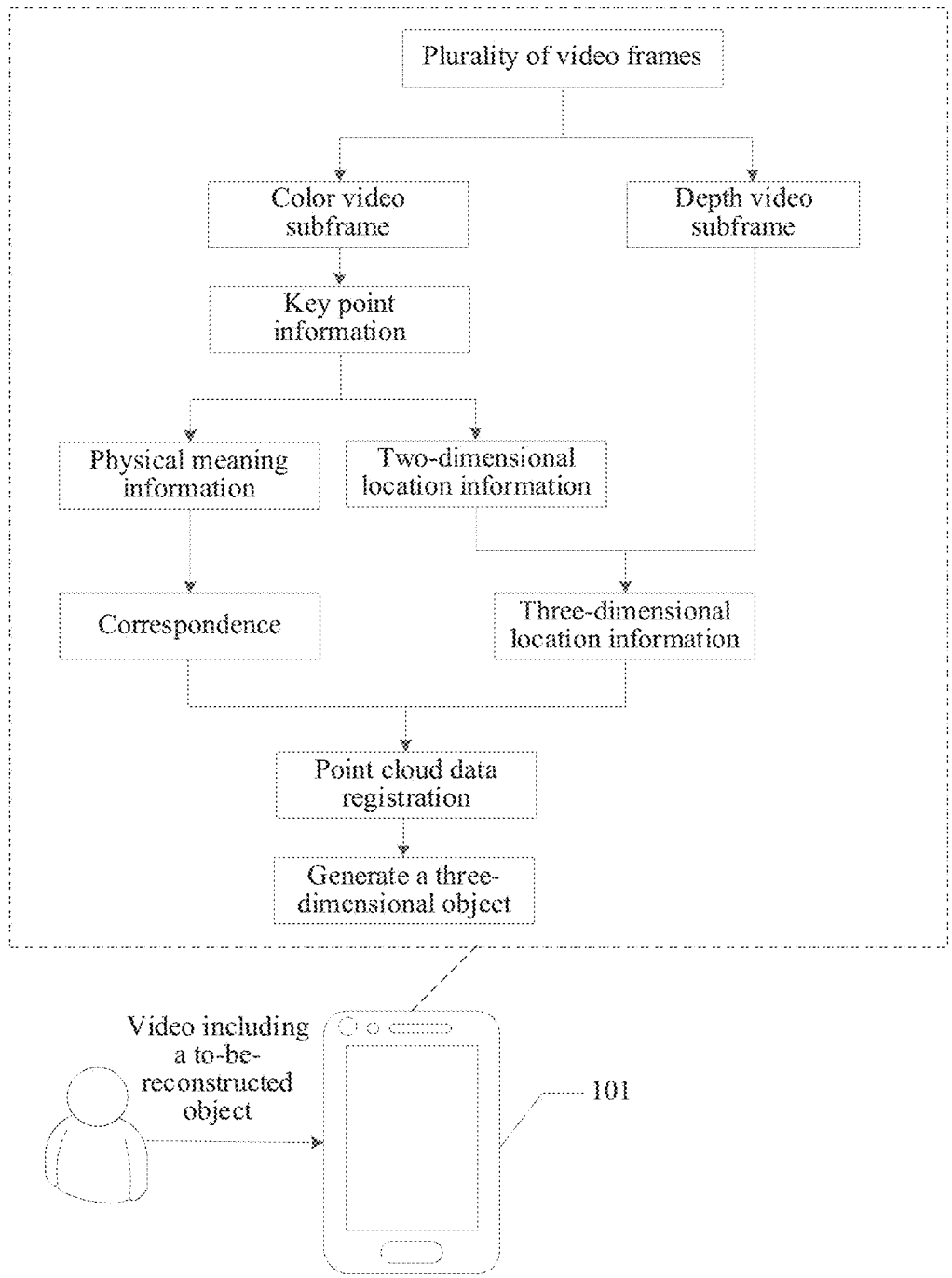
FIG. 1 is a schematic diagram of an application scenario of a three-dimensional object reconstruction method according to an embodiment of the disclosure.

FIG. 1 is a schematic diagram of an application scenario of a three-dimensional object reconstruction method according to an embodiment of the disclosure. The application scenario includes a terminal device 101. The terminal device 101 may obtain a plurality of video frames of an object that requires three-dimensional reconstruction. The object may be a human face or another part of a human body, for example. The object may also be a thing. FIG. 1 merely uses a human face as an example of the object, but the disclosure is not limited.

The plurality of video frames may be extracted from a video including the object. The video including the object may be obtained by photographing (or capturing) the object using the terminal device 101 or may be obtained by photographing the object using another photographing device (or capturing device). If the video including the object is obtained by photographing the object using another photographing device, the terminal device 101 needs to obtain the video from the another photographing device.

During photographing of the object, the object needs to maintain still as far as possible. The terminal device 101 or the another photographing device moves according to a certain movement trajectory, so as to photograph the object from different angles. The movement trajectory may be, for example, a trajectory that allows the terminal device 101 or the another photographing device to move in a direction such as a horizontal direction and/or a vertical direction.

Alternatively, the position of the terminal device 101 or the another photographing device may be fixed to maintain the terminal device 101 or the another photographing device still, and then the object is rotated according to a movement trajectory, so that the object may be photographed from different angles. The movement trajectory may be, for example, a trajectory that allows the object to rotate in a direction such as the horizontal direction and/or the vertical direction.

Any video frame includes a color video subframe and a depth video subframe. Key point information of the object in a video frame may be determined according to the color video subframes. The key point information includes two-dimensional location information of key points and physical meaning information of the key points with respect to the object.

The key points may refer to some feature points that may reflect positions on the object in the video frames. If the object is a human face, the key points may include facial contour feature points at positions such as the left eyebrow, the right eyebrow, the inner corner of the left eye, the outer corner of the left eye, the inner corner of the right eye, the outer corner of the right eye, the nose tip, the left nose wing, the right nose wing, the left corner of the mouth, and the right corner of the mouth.

The physical meaning information refers to descriptive information describing a key point in a common language. The physical meaning information may reflect a specific position on the object reflected by a key point in any one of the video frames.

In an example in which the object is a human face, the physical meaning information may be the left eyebrow, the right eyebrow, the inner corner of the left eye, the outer corner of the left eye, the inner corner of the right eye, the outer corner of the right eye, the nose tip, the left nose wing, the right nose wing, the left corner of the mouth, the right corner of the mouth, or the like. If physical meaning information of a key point in a video frame with respect to the human face is the inner corner of the left eye, the physical meaning information reflects that the key point is at the inner corner of the left eye on the human face. Thus, the physical meaning information may indicate respective positions (or respective parts) of the object.

Therefore, a correspondence between the key points in the plurality of video frames may be determined based on physical meaning information of the key points with respect to the object, so as to indicate which key points in the plurality of video frames have the same physical meaning information.

In an example in which the object is a human face, it is assumed that physical meaning information of a key point A in a video frame with respect to the human face is a corner of an eye, and physical meaning information of a key point A' in another video frame with respect to the human face is the corner of the eye. In this case, the key point A and the key point A' are key points having the same physical meaning information, and the key point A and the key point A' reflect the same position on the human face. Therefore, it may be determined that the key point A has a correspondence with the key point A'.

After the three-dimensional location information of the key points is determined by using the depth video subframes, registration of point cloud data in the plurality of video frames may be performed efficiently according to the correspondence between key points and the three-dimensional location information of the key points, which not only reduces the amount of computation, but also has high accuracy, achieving a better three-dimensional object reconstruction effect.

Next, the three-dimensional object reconstruction method provided in the embodiments of the disclosure is described in detail with reference to the accompanying drawings by using a terminal device as an example.

Figure 2:
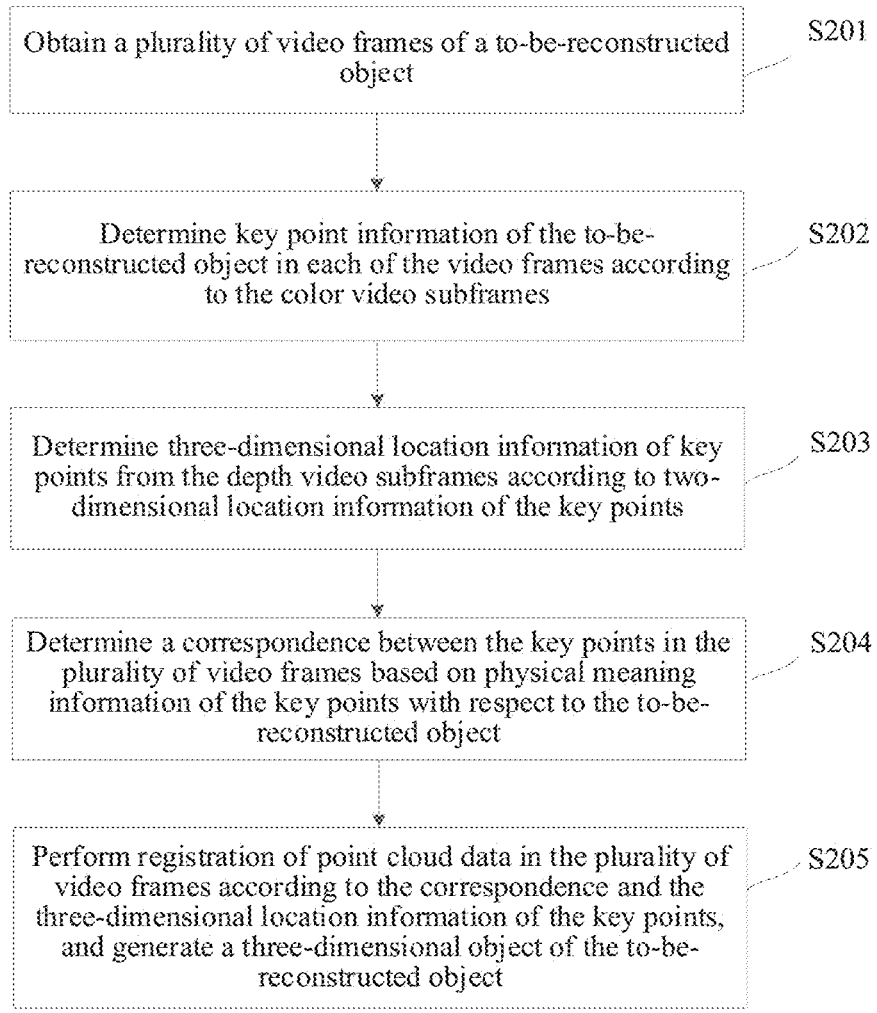
FIG. 2 is a flowchart of a three-dimensional object reconstruction method according to an embodiment of the disclosure.

FIG. 2 is a flowchart of a three-dimensional object reconstruction method. The method includes S201-S205:

S201. Obtain a plurality of video frames of an object, any one of the video frames including a color video subframe and a depth video subframe.

To avoid the use of any other device in addition to the terminal device in the three-dimensional reconstruction process so as to reduce costs, in an example embodiment, the object is photographed by using the terminal device to obtain a video including the object, so as to obtain the plurality of video frames of the object from the video. The terminal device has a color camera and a depth sensor. The terminal device may acquire a video frame including a color video subframe and a depth video subframe by using the color camera and the depth sensor.

In an example in which the object is a human face, a user photographs the human face by using the terminal device and obtain a video including the human face. The video may be referred to as an RGB-D video. Then, the terminal device extracts the plurality of video frames from the video.

One video frame may be divided into a color video subframe and a depth video subframe. The color video subframe has colors and texture, and key positions on the object may be recognized more easily by using the color video subframes. Therefore, key point information may be determined according to the color video subframes. The key point information includes two-dimensional location information of key points and physical meaning information of the key points with respect to the object. The depth video subframe may reflect depth information of the object. Therefore, depth information of the key points may be obtained according to the depth video subframes. Three-dimensional location information of the key points is further determined according to the two-dimensional location information of the key points and the depth information of the key points.

S202. Determine key point information of the object in each of the video frames according to the color video subframes.

Figure 3:
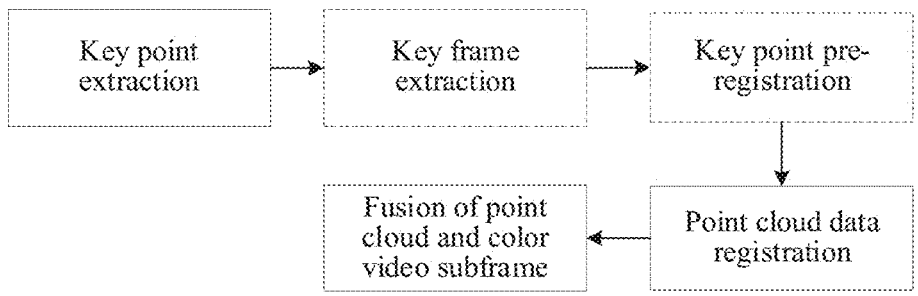
FIG. 3 shows a procedure of processing a plurality of video frames according to an embodiment of the disclosure.

In this embodiment, after the terminal obtains the plurality of video frames, a three-dimensional image of the object may be obtained through a processing procedure shown in FIG. 3. The processing procedure at least includes three operations: key point extraction, point cloud data registration, and fusion of point clouds and the color video subframes. Operations shown in dashed-line boxes, for example, key frame extraction and key point pre-registration, are optional operations. The operation of key point extraction includes S202 and S203, which will be described below. The three-dimensional location information and physical meaning information of the key points are finally obtained by key point extraction.

If the object is a human face determining the key point information in the video frames is equivalent to obtaining prior information of the human face in advance. A correspondence between the key points in the plurality of video frames may be determined more quickly and accurately according to the prior information of the human face, thereby achieving efficient point cloud data registration.

The key point information of the object in the video frame may be determined in various manners. In many cases, the color video subframe includes other content in addition to the object. To avoid unnecessarily determining key point information in the other content in the color video subframe so as to improve processing efficiency, in an example embodiment, a target region in which the object is located may be determined first, and then the key point information may be determined based on video frame data of the target region. The terminal device may perform object detection on the color video subframe by using a first network model and determine, in the color video subframe, the target region in which the object is located. Then the terminal device extracts the video frame data of the target region and determines the key point information of the object in the video frame based on the video frame data of the target region by using a second network model.

The first network model and the second network model both are deep neural network models. The first network model and the second network model may respectively include various types of models. In an example embodiment, the first network model is a Multi-task Convolutional Neural Network (MTCNN) deep neural network model, and the second network model may be an hourglass deep neural network model. However, the deep neural network models are not limited to the foregoing two models.

Figure 4:
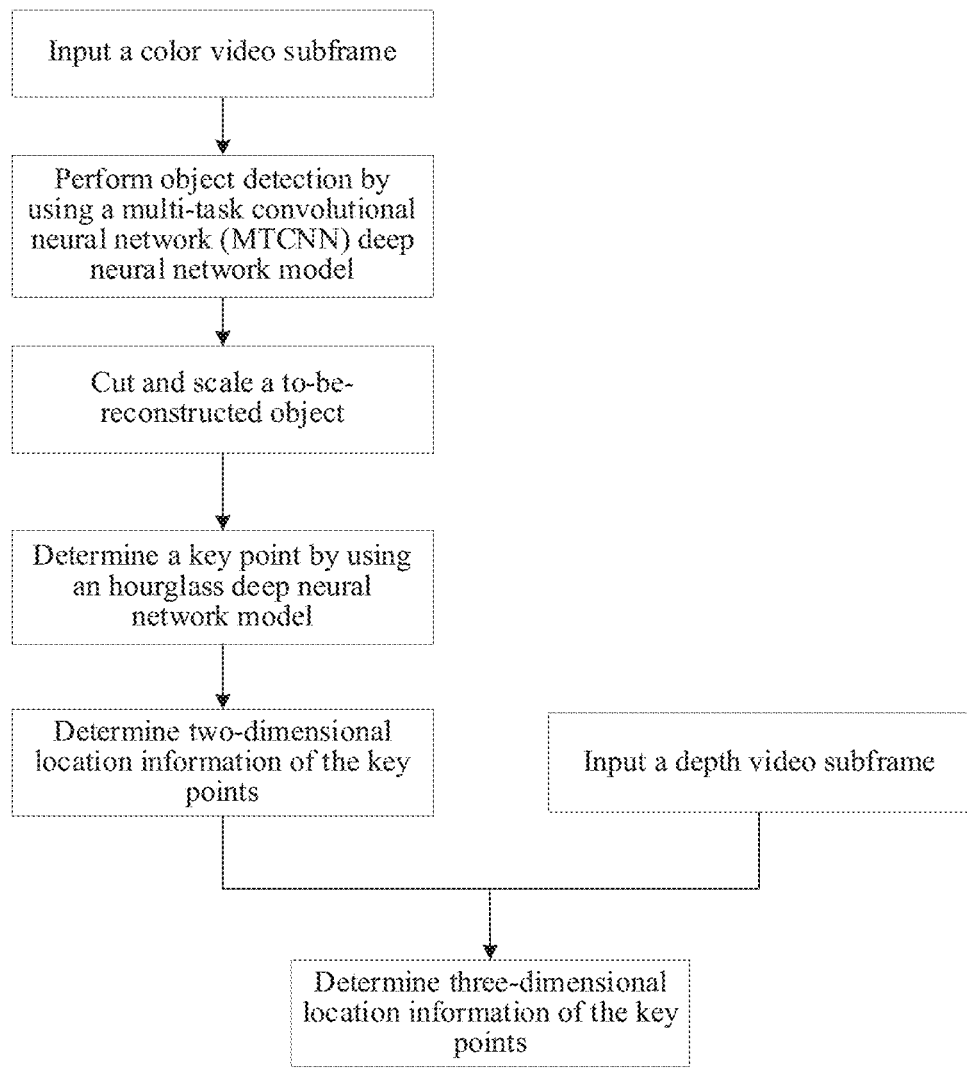
FIG. 4 shows a procedure of determining key point information according to an embodiment of the disclosure.

Reference may be made to FIG. 4 for an illustrative process of determining the key point information. The terminal device may first use an MTCNN deep neural network model to perform object detection on a color video subframe, determine, in the color video subframe, a target region in which the object is located, and extract video frame data of the target region as an input of an hourglass deep neural network model. The terminal device uses the hourglass deep neural network model to perform a series of operations such as convolution, ReLU Activation, Fully-Connected, and softmax operations, output a probability that each pixel in the video frame data of the target region is a key point, determine the maxima of the probability as key points of the object, and then determine two-dimensional location information of the key points. At the same time, the hourglass deep neural network model outputs physical meaning information of each key point.

However, during actual implementation, after determining the target region, the terminal device may obtain the target region by cutting, and scale the obtained target region to a target size, for example, scale the target region to a size of 512×512 (pixels), and then uses video frame data of the scaled target region as the input of the hourglass deep neural network model.

S203. Determine three-dimensional location information of the key points from the depth video subframes according to the two-dimensional location information of the key points.

The color video subframe and the depth video subframe are obtained by dividing the same video frame, the color video subframe and the depth video subframe are pictures of the object at the same moment, and key points in the color video subframe are in a one-to-one correspondence with key points in the depth video subframe. Therefore, referring to FIG. 4, a location of each key point in the depth video subframe may be determined according to the two-dimensional location information of the each key point. Then, depth information corresponding to the location is determined. In this way, three-dimensional location information of the each key point may be obtained according to the two-dimensional location information and the depth information.

Figure 5A:
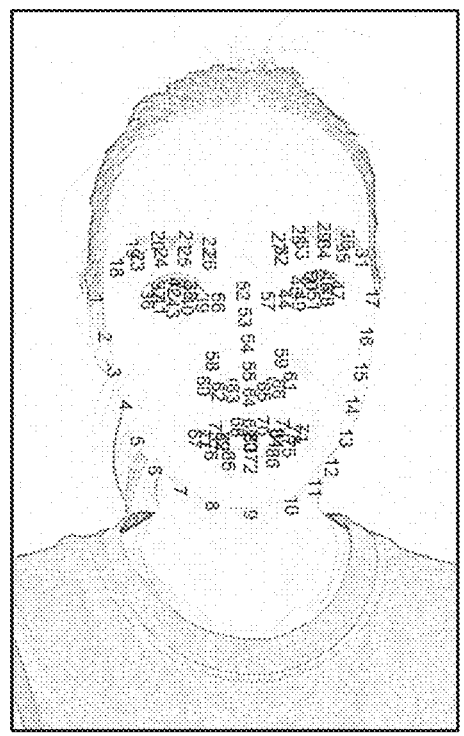
FIG. 5a is an exemplary diagram of a result of key point extraction according to an embodiment of the disclosure.
Figure 5B:
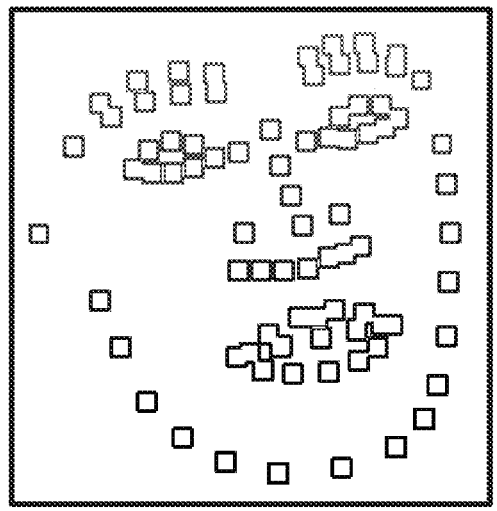
FIG. 5b is an exemplary diagram of a result of key point extraction according to an embodiment of the disclosure.
Figure 5C:
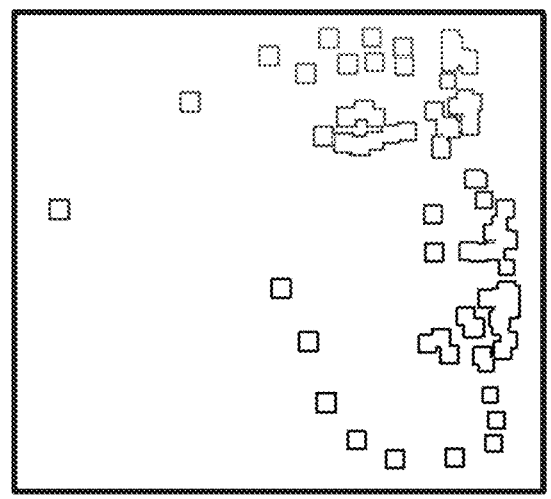
FIG. 5c is an exemplary diagram of a result of key point extraction according to an embodiment of the disclosure.

In an example in which the object is a human face, based on the method provided in the embodiment corresponding to FIG. 4, reference may be made to FIG. 5a to FIG. 5c for a result of the key point extraction. In FIG. 5a to FIG. 5c, a total of 86 key points on the human face are determined. FIG. 5a shows a result of two-dimensional extraction, which may be used for determining key point information. In FIG. 5a, points marked by numbers are key points. FIG. 5b and FIG. 5c show results of three-dimensional extraction from different angles, which may be used for determining three-dimensional location information. Dark points in FIG. 5b and FIG. 5c are key points.

S204. Determine the correspondence between the key points in the plurality of video frames based on the physical meaning information of the key points with respect to the object.

Physical meaning information may reflect a specific position on the object reflected by a key point in any one of the video frames. Therefore, the correspondence between the key points in the plurality of video frames may be determined based on the physical meaning information of the key points with respect to the object. If the object is a human face, it is equivalent to obtaining prior information of the human face in advance. The correspondence between the key points in the plurality of video frames may be determined fast and accurately, so as to indicate which key points in the plurality of video frames have the same physical meaning information. Therefore, the registration of point cloud data in the plurality of video frames may be performed efficiently according to the correspondence between key points and the three-dimensional location information of the key points.

The order in which S203 and S204 are performed is not limited in this embodiment.

S205. Perform registration of point cloud data in the plurality of video frames according to the correspondence between key points and the three-dimensional location information of the key points, and generate a three-dimensional object (or a three-dimensional reconstructed object) of the object.

For point cloud data in each video frame, a three-dimensional object is generated by performing efficient registration of the point cloud data and a fusion on the point cloud and the color video subframe according to the correspondence between the key points and the three-dimensional location information of the key points. This process corresponds to operations shown in the second solid box and the third solid box (or the last two solid boxes in the flowchart) in FIG. 3. Fusion used herein may mean that a TSDF fusion algorithm may be used.

Figure 5D:
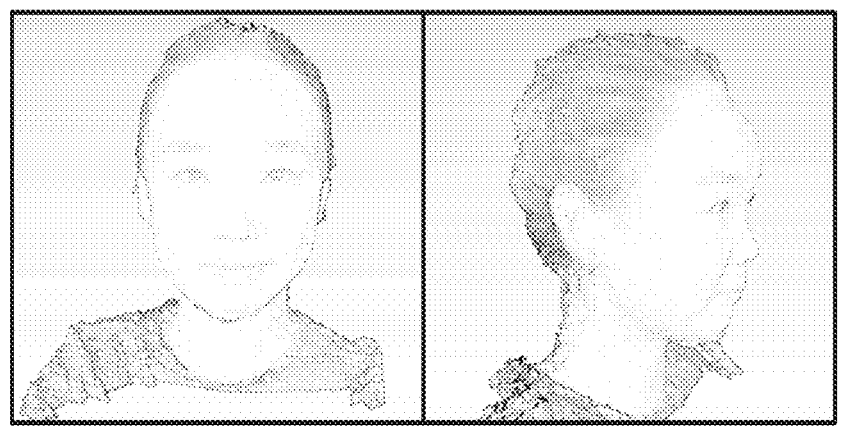
FIG. 5d is a diagram showing effects of displaying a three-dimensional object from different angles according to an embodiment of the disclosure.

In an example in which the object to be reconstructed is a human face, the object obtained by three-dimensional reconstruction is shown in FIG. 5d. FIG. 5d shows effects of displaying a three-dimensional object from different angles. The point cloud refers to a set of feature points on a surface of the object and includes key points and other feature points.

It can be seen from the foregoing technical solutions that the plurality of video frames of the object are obtained, any one of the video frames including the color video subframe and the depth video subframe. The key point information of the object in each of the video frames is determined according to the color video subframes, the key point information including the two-dimensional location information of the key points and the physical meaning information of the key points with respect to the object. The physical meaning information may reflect a specific position on the object reflected by a key point in any one of the video frames. Therefore, the correspondence between the key points in the plurality of video frames may be determined based on the physical meaning information of the key points with respect to the object, so as to indicate which key points in the plurality of video frames have the same physical meaning information. Therefore, after the three-dimensional location information of key points in each video frame is determined by using the depth video subframe, the registration of point cloud data in the plurality of video frames may be performed efficiently according to the correspondence between the key points and the three-dimensional location information of the key points, which not only reduces the amount of computation, but also has high accuracy, achieving a better three-dimensional object reconstruction effect.

In some three-dimensional reconstruction scenarios, relatively high real-time performance may be needed, so that a user may endure a waiting time in the three-dimensional reconstruction. To improve the real-time performance of the three-dimensional reconstruction, this embodiment improves, from the perspective of reducing the amount of data that the terminal device needs to process, the efficiency of point cloud data registration performed by the terminal device, so as to improve the real-time performance of three-dimensional reconstruction. Therefore, in an example embodiment, a small quantity of high-quality video frames may be used as a basis for point cloud data registration. A high-quality video frame may be a key frame.

Figure 6:
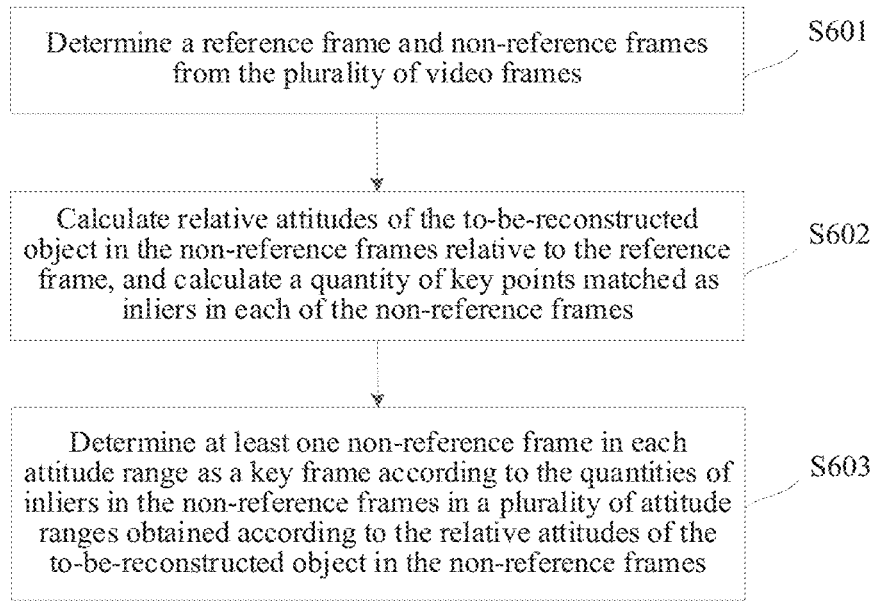
FIG. 6 is a flowchart of a method for determining key frames according to an embodiment of the disclosure.

Therefore, it is necessary to determine a key frame from the video frame before S205 is performed, that is, operation shown in the first dashed line box in the processing procedure shown in FIG. 3. Next, a method of determining the key frame is described. Referring to FIG. 6, the method includes the following operations S601-S603:

S601. Determine a reference frame and non-reference frames from the plurality of video frames.

In this embodiment, any video frame from the plurality of video frames may be selected as the reference frame, and remaining video frames are used as non-reference frames.

In an example embodiment, the plurality of video frames may be obtained in a manner in which the terminal device moves in a movement trajectory and photographs (or captures) the object from different angles. To make the subsequent calculation of relative attitudes (or orientation or coordinates) of the object relatively simple and ensure a three-dimensional reconstruction effect, a video frame obtained in a manner in which the object faces towards the terminal device may be used as the reference frame.

Figure 7:
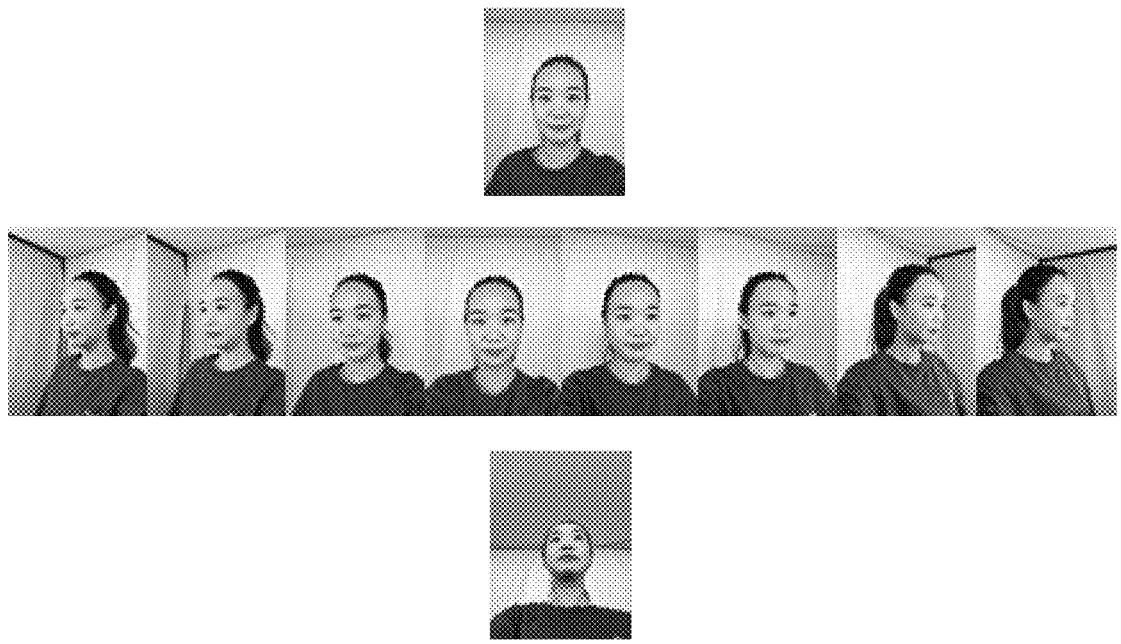
FIG. 7 is an exemplary diagram of a reference frame and key frames according to an embodiment of the disclosure.

In an example in which the object is a human face, the reference frame determined by the terminal device may be a video frame of a front face. The front face refers to that the human face faces towards the terminal device, as shown in the first row in FIG. 7.

S602. Calculate relative attitudes of the object in the non-reference frames relative to the reference frame, and calculate a quantity of key points matched as inliers in each of the non-reference frames.

Figure 8:
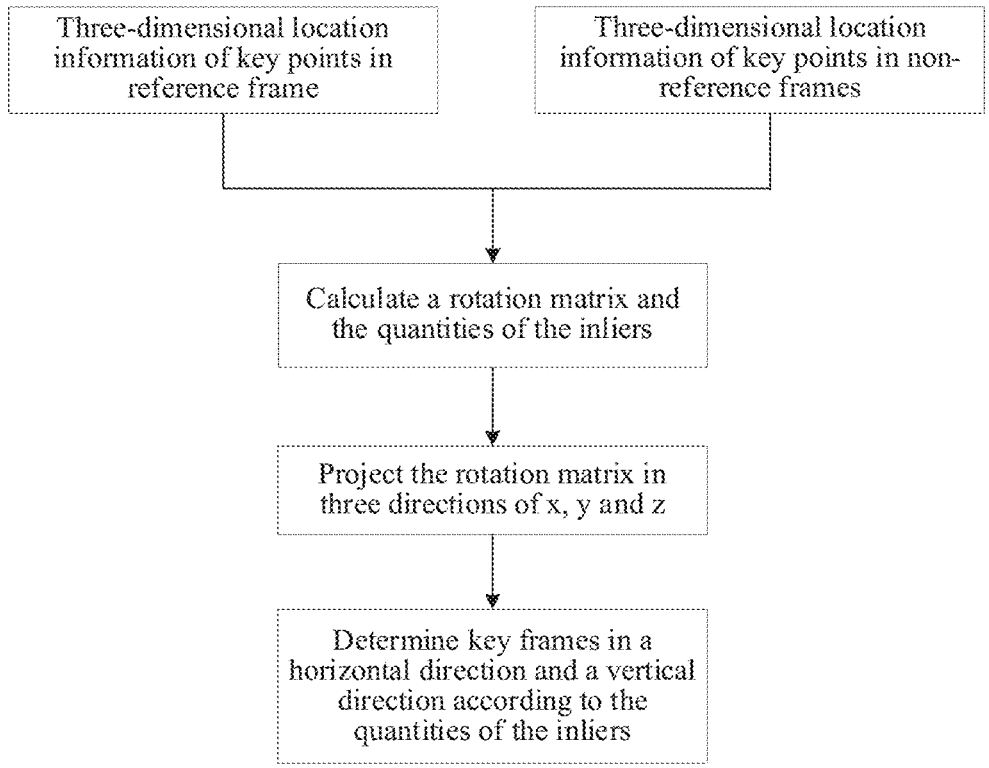
FIG. 8 shows a processing procedure of determining key frames according to a reference frame and non-reference frames according to an embodiment of the disclosure.

In this embodiment, FIG. 8 shows a processing procedure of determining the key frame according to the reference frame and the non-reference frames. After the terminal device determines the reference frame and the non-reference frame, three-dimensional location information of key points in the reference frame and the non-reference frame are obtained. The terminal device may calculate relative attitudes of the object in all the non-reference frames relative to the reference frame by using a random sample consensus (RANSAC), and calculate the quantity of the inliers in the non-reference frames at the same time. The relative attitude of the object may reflect an angle of rotation of the object in the non-reference frame relative to the object in the reference frame and may be represented by using a rotation matrix. The inliers are key points in the non-reference frame that may be matched with the key points in the reference frame according to the correspondence.

S603. Determine at least one non-reference frame in each attitude range as a key frame according to the quantities of inliers in the non-reference frames in a plurality of attitude ranges obtained according to the relative attitudes of the object in the non-reference frames.

A larger quantity of the inliers in the non-reference frame indicates a larger quantity of key points matching the reference frame in the non-reference frame. An effect of performing registration of the point cloud data in the plurality of the video frames by using such a non-reference frame is better, and a better three-dimensional object reconstruction effect is achieved. Therefore, a non-reference frame having a largest quantity of inliers in each attitude range may be used as a key frame, so that the obtained key frame is a high-quality video frame, which is conductive to achieving a better three-dimensional object reconstruction effect.

When a key frame is obtained, an implementation of S205 is to perform registration of the point cloud data in the plurality of video frames according to the correspondence between key frames and three-dimensional location information of inliers in the reference frame and the key frames.

A small number of key frames are used in this embodiment as the basis for point cloud data registration, thereby reducing the amount of data that the terminal device needs to process, improving the efficiency of point cloud data registration by the terminal device, and improving the real-time performance of three-dimensional reconstruction.

At the same time, in some three-dimensional reconstruction scenarios, outliers may exist in the non-reference frames, and outliers are key points in the non-reference frames that do not match the reference frame. The reason why a key point in the non-reference frame does not match a key point in the reference frame may be the inaccuracy of the depth sensor, or may be a non-rigid change of the object (for example, a human face). The outlier may be, for example, a point on the leftmost side in the FIG. 5c. In this embodiment, the key frame is the non-reference frame having the largest quantity of the inliers, thereby reducing impact of an outlier on point cloud data registration in the plurality of video frames.

In addition, point cloud data registration is performed based on the key frame. Compared with the conventional point cloud data registration method, only video frames at moment t−1 and moment t are stored in the terminal device, and point cloud data registration is performed on the video frame at moment t and the video frame at moment t−1. For example, point cloud data registration is performed on a video frame at moment 2 s and a video frame at moment 1 s to obtain a registered video frame, and point cloud data registration is performed on a video frame at moment 3 s and a video frame at moment 2 s, and in this case, the video frame at moment 2 s is the video frame registered previously. The rest is deduced by analogy. After the first point cloud data registration, there is an error in the registered video frame. The second point cloud data registration is performed by using the first registered video frame, that is, performed based on a video frame having an error, resulting in a greater error in the second point cloud data registration. Similarly, as a quantity of times of point cloud data registration increases, the error becomes larger, resulting in cumulative errors between frames and affecting final three-dimensional reconstruction effect. In this embodiment, when the key frames are used for point cloud data registration, the point cloud data registration is respectively performed for each key frame based on the reference frame, thereby avoiding cumulative errors between frames.

Figure 9A:
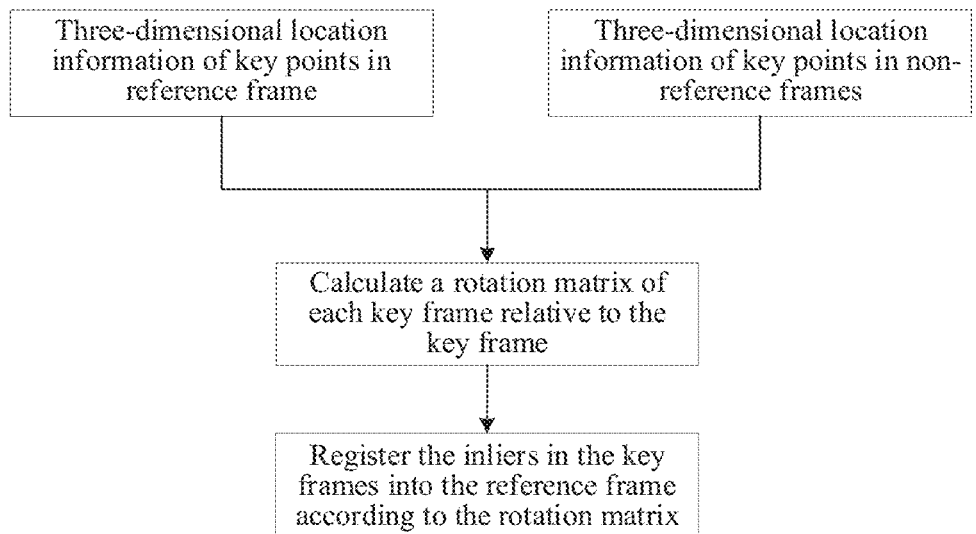
FIG. 9a shows a processing procedure of pre-registration according to an embodiment of the disclosure.
Figure 9B:
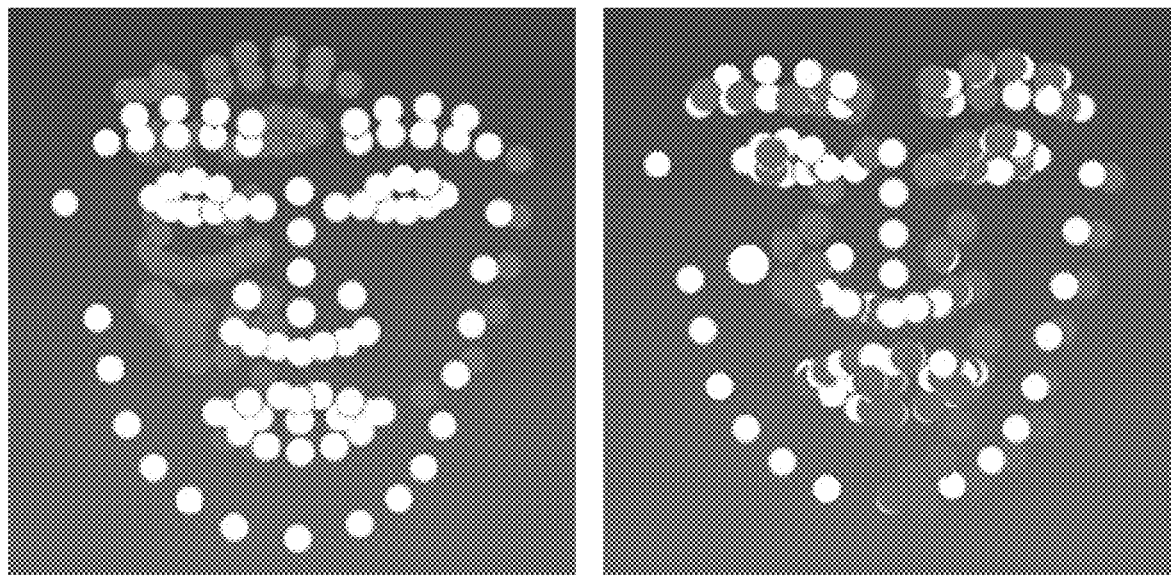
FIG. 9b is an exemplary diagram of a result of pre-registration according to an embodiment of the disclosure.

The inliers in the key frames are key points matching the reference frame and may precisely reflect a position on the object. Therefore, in an example embodiment, performing registration of the point cloud data in the plurality of video frames according to the correspondence between key points and three-dimensional location information of inliers in the reference frame and the key frames may be rotating the inliers in the key frames according to the relative attitudes of the object in the key frames relative to the reference frame, to perform pre-registration with the inliers in the reference frame. A processing procedure for the pre-registration is shown in FIG. 9a. The relative attitude of the object may be represented by using a rotation matrix. The terminal device respectively obtains three-dimensional location information of key points in each key frame and reference frame, calculates a rotation matrix of each key frame relative to the reference frame, and registers the inliers in the key frames into the reference frame according to the rotation matrix. In an example in which the object is a human face, a result of the pre-registration is as shown in FIG. 9b. The left side in FIG. 9b shows an exemplary diagram before the pre-registration, and the right side shows an exemplary diagram after the pre-registration. White points are key points in the reference frame, and gray points are randomly selected key points in the key frame.

Figure 10A:
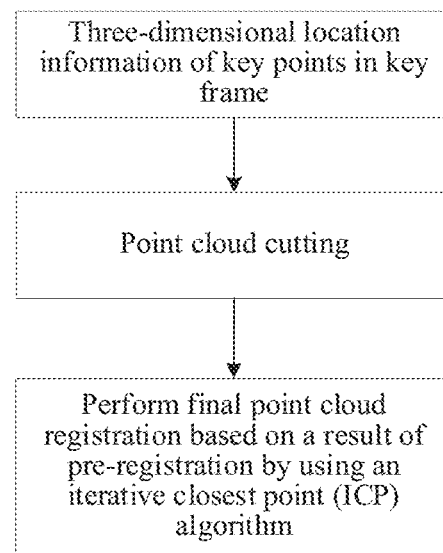
FIG. 10a shows a processing procedure of final point cloud registration according to an embodiment of the disclosure.
Figure 10B:
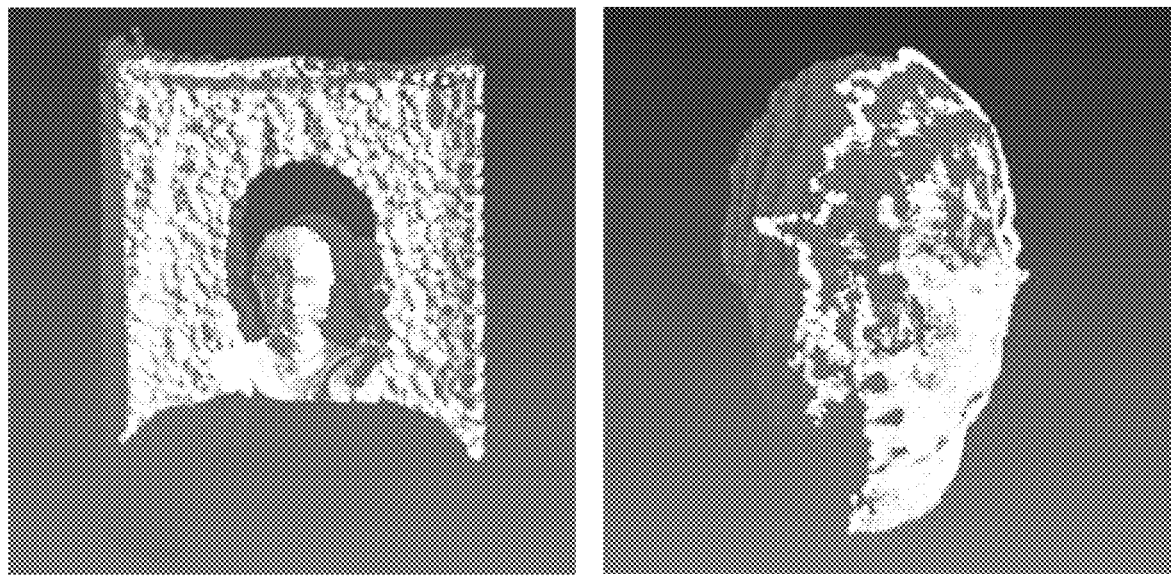
FIG. 10b is an exemplary diagram of a result of final point cloud registration according to an embodiment of the disclosure.

After the terminal device finishes the pre-registration, the point cloud data registration in the plurality of video frames is performed according to the result of the pre-registration. In an example embodiment, in which the object is a human face, as shown in FIG. 10a, the terminal device first determines point cloud data in the key frame according to the depth video subframe, and then cuts the point cloud by using a key point in the middle of the bridge of the nose (for example, a point numbered 53 in FIG. 5a) as a sphere center, and next, performs final point cloud registration based on the result of the pre-registration by using an iterative closest point (ICP) algorithm. Reference may be made to FIG. 10b for a result of the final point cloud registration. The left side in FIG. 10b shows an exemplary diagram before the final registration, and the right side shows an exemplary diagram after the final registration. White points are a point cloud in the reference frame, and gray points are a randomly selected point cloud in the key frame.

Next, the division of attitude ranges and how to determine a key frame according to the divided attitude range are described in detail.

The attitude ranges may be divided in different directions such as a horizontal direction or a vertical direction. A specific direction in which the attitude ranges are divided is related to the movement trajectory of the terminal device. If the movement trajectory indicates that most of the time the terminal device moves in a horizontal direction to photograph the object, the attitude ranges may be divided in the horizontal direction. If most of the time the terminal device moves in a vertical direction to photograph the object, the attitude ranges may be divided in the vertical direction.

An example in which the object is a human face, and the terminal device is a mobile phone is used. As an example, a movement trajectory of the mobile phone is as follows: moving the mobile phone to face towards a human face and starting photographing; moving the mobile phone slowly and horizontally to the left side of the human face, until the left ear may be completely photographed; moving the mobile phone slowly and horizontally to the right side of the human face, until the right ear may be completely photographed; moving the mobile phone slowly and horizontally to face towards the face; and moving the mobile phone slowly and vertically to a position below the object, until the jaw may be completely photographed. In view of this, when photographing a human face, the mobile phone mainly moves in a horizontal direction. Therefore, the attitude ranges may be divided in a horizontal direction.

The attitude ranges may be divided in various manners. Generally, the division manners of the attitude ranges differ according to various movement trajectories in which the terminal device photographs the object. If the movement trajectory indicates that the terminal device mainly moves in a horizontal direction, in an example embodiment, a division manner of the attitude ranges is as follows: the terminal device determines an angle range in the horizontal direction according to the relative attitudes of the object in the non-reference frames, and then the terminal device divides the angle range into the plurality of attitude ranges according to an angle threshold.

The object and the movement trajectory are still used as an example. As shown in FIG. 8, after the terminal device calculates the relative attitude (rotation matrix) of the object, the rotation matrix may be projected in three directions, namely, x (horizontal) direction, y (vertical) direction, and z (front-back) direction. Then, the terminal device determines the angle range in the horizontal direction according to the relative attitudes of the object in the non-reference frames. The terminal device divides the angle range into the plurality of attitude ranges such as k attitude ranges according to the angle threshold (for example, 20 degrees), and selects a video frame having a largest quantity of the inliers in each attitude range as a key frame, so as to obtain K key frames, and k is a positive integer. Next, the terminal device may select a video frame whose angle of rotation is largest in the y (vertical) direction relative to the reference frame as a K+1$^{th}$ key frame (the key frame is used for reconstructing the jaw of a person).

Figure 11A:
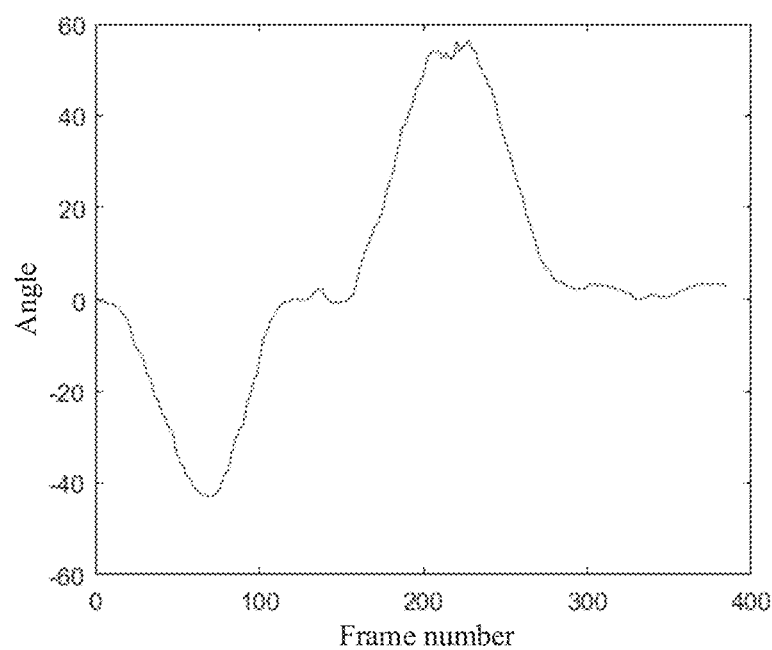
FIG. 11a is a schematic diagram of an angle of rotation of each non-reference frame in an x (horizontal) direction relative to a reference frame according to an embodiment of the disclosure.
Figure 11B:
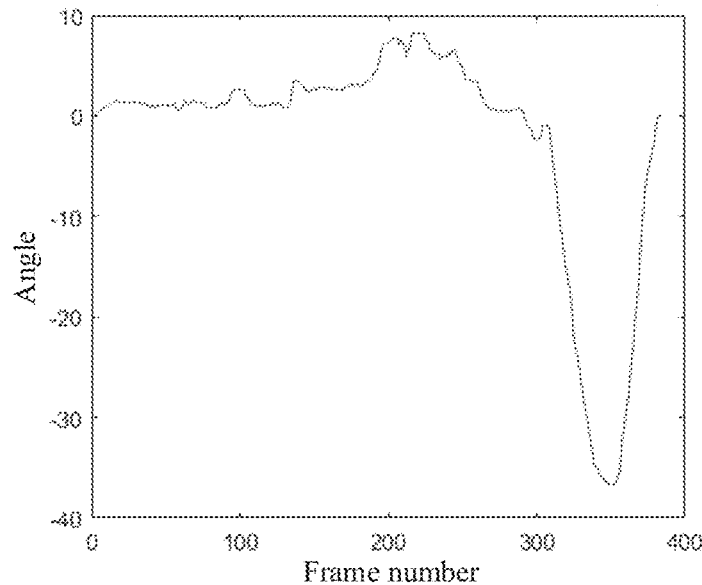
FIG. 11b is a schematic diagram of an angle of rotation of each non-reference frame in a y (vertical) direction relative to a reference frame according to an embodiment of the disclosure.

FIG. 11a and FIG. 11b respectively shows angle of rotation of each non-reference frame in the x (horizontal) direction and y (vertical) direction relative to the reference frame. In FIG. 11a, a maximum angle at which the non-reference frame rotates in the horizontal direction relative to the reference frame is respectively close to or less than 60 degrees to the left or right. Therefore, this embodiment may determine that the angle range in the horizontal direction is −60 degrees to 60 degrees. If the angle threshold is 20 degrees, the terminal device may divide the angle range into 6 attitude ranges, so that at least one video frame having a largest quantity of inliers is selected from each attitude range as a key frame, for example, 8 key frames are obtained in the horizontal direction. Next, a video frame having a largest angle of rotation is selected according to angles of rotation of non-reference frames shown in FIG. 11b in the y (vertical) direction relative to the reference frame as a 9 key frame. In this way, all of the obtained key frames are shown in the second row and the third row in FIG. 7, where the second row is key frames determined in the horizontal direction, and the third row is a key frame determined in the vertical direction.

When at least one non-reference frame in each attitude range is determined as a key frame according to the quantities of the inliers in the non-reference frames, if the object is a human face, and the human face may undergo a non-rigid change, positions of key points in different video frames are significantly changed. For example, key points on the human face whose physical meaning information is the inner corner of the left eye, the outer corner of the left eye, the inner corner of the right eye, the outer corner of the right eye, the left corner of the mouth, or the right corner of the mouth are likely to cause significant changes of positions of the same key points in different video frames due to non-rigid changes (e.g., expression changes) of the human face. If a non-reference frame in which expression change occurs is determined as a key frame, a three-dimensional reconstruction effect may be affected.

For example, the object is a human face, and a non-reference frame A and a non-reference frame B respectively include 20 key points. If a quantity of key points matching the reference frame in the non-reference frame A is 12, that is, the quantity of inliers in the non-reference frame A is 12, and if a quantity of key points matching the reference frame in the non-reference frame B is 10, that is, the quantity of inliers in the non-reference frame B is 10. Then, generally, due to a larger quantity of inliers in the non-reference frame A, the non-reference frame A may be determined as a key frame. However, if a facial expression changes in the non-reference frame A, such as blinking, and the non-reference frame A is determined as a key frame based on the expression change and used for three-dimensional reconstruction, a three-dimensional reconstruction effect will be affected.

In this case, an example embodiment of determining at least one non-reference frame in each attitude range as a key frame according to the quantities of inliers in the non-reference frames may be setting a weight for each of the key points according to the physical meaning information of the key points; determining an inlier score in the non-reference frame based on weights and the quantity of the inliers in the non-reference frame; and determining at least one non-reference frame as the key frame in the each attitude range according to the inlier scores of the non-reference frames.

A weight of a key point whose physical meaning information reflects a deformable feature is greater than a weight of a key point whose physical meaning information reflects a non-deformable feature. If a non-rigid change occurs on the human face in a non-reference frame, there may be fewer inliers whose physical meaning information reflects a deformable feature in the non-reference frame, which may result in a lower inlier score of the non-reference frame. In this way, even if the quantity of inliers in the non-reference frame is greater than that in other non-reference frames, when a key frame is determined according to an inlier score, the non-reference frame will not be determined as a key frame due to a lower inlier score, thereby avoiding the case where a three-dimensional reconstruction effect is affected due to changes on the object in the non-reference frame.

For example, the object is a human face, the non-reference frame A and the non-reference frame B respectively include 20 key points, and the human face in the non-reference frame A has an expression change of blinking. It is determined that the quantity of inliers in the non-reference frame A is 12, physical meaning information of two inliers among the 12 inliers of the non-reference frame A correspond to the inner corner of the left eye and the outer corner of the left eye, and physical meaning information of remaining ten inliers is the left nose wing and right nose wing. The quantity of inliers in the non-reference frame B is ten, physical meaning information of six inliers in the ten inliers are the inner corner of the left eye and the outer corner of the left eye, and physical meaning information of remaining four inliers is the left nose wing and right nose wing. If a weight of a key point whose physical meaning information is related to an eye (as an example of a key point whose physical meaning information reflects a deformable feature) is two, and a weight of a key point whose physical meaning information is related to the nose (as an example of a key point whose physical meaning information reflects a non-deformable feature) is one, then an inlier score of the non-reference frame A is determined to be 2×2+10×1=14, and an inlier score of the non-reference frame B is 6×2+4×1=16. Because the inlier score of the non-reference frame B is greater than that of the non-reference frame A, the non-reference frame B rather than the non-reference frame A is determined as the key frame, so as to avoid impact of the expression change of blinking in the non-reference frame A on a three-dimensional reconstruction effect.

Figure 11C:
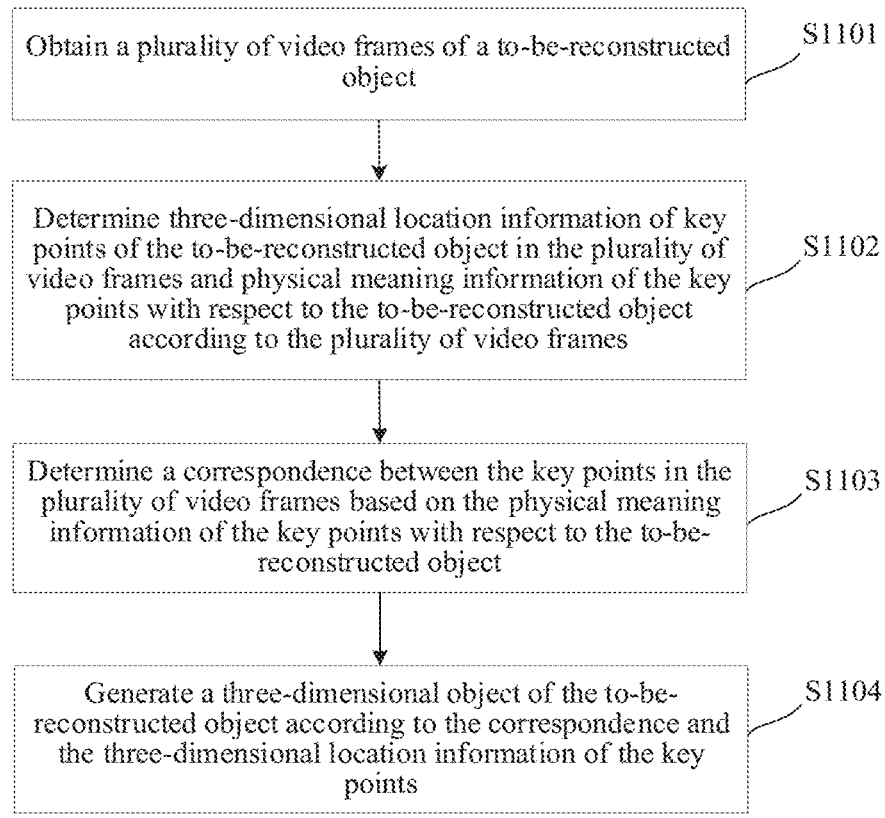
FIG. 11c is a flowchart of a three-dimensional object reconstruction method according to an embodiment of the disclosure.

Referring to FIG. 11c, the embodiments of the disclosure further provide another three-dimensional object reconstruction method, including:

S1101. Obtain a plurality of video frames of an object.

In an example embodiment, any one of the video frames includes a color video subframe and a depth video subframe.

S1102. Determine three-dimensional location information of key points of the object in the plurality of video frames and physical meaning information of the key points with respect to the object according to the plurality of video frames.

If any one of the video frames includes the color video subframe and the depth video subframe, reference may be made to the implementation of S202 and S203 for an example embodiment of S1102.

S1103. Determine a correspondence between the key points in the plurality of video frames based on the physical meaning information of the key points with respect to the object.

The correspondence is used for identifying key points having the same physical meaning information in the plurality of video frames.

S1104. Generate a three-dimensional object of the object according to the correspondence between the key points and the three-dimensional location information of the key points.

Reference may be made to the description of S205 in FIG. 2 for an example embodiment of S1104.

Reference may be made to the implementations of the embodiments corresponding to FIG. 2 for all possible implementations of the embodiment corresponding to FIG. 11c, and details are not described herein again.

Figure 12:
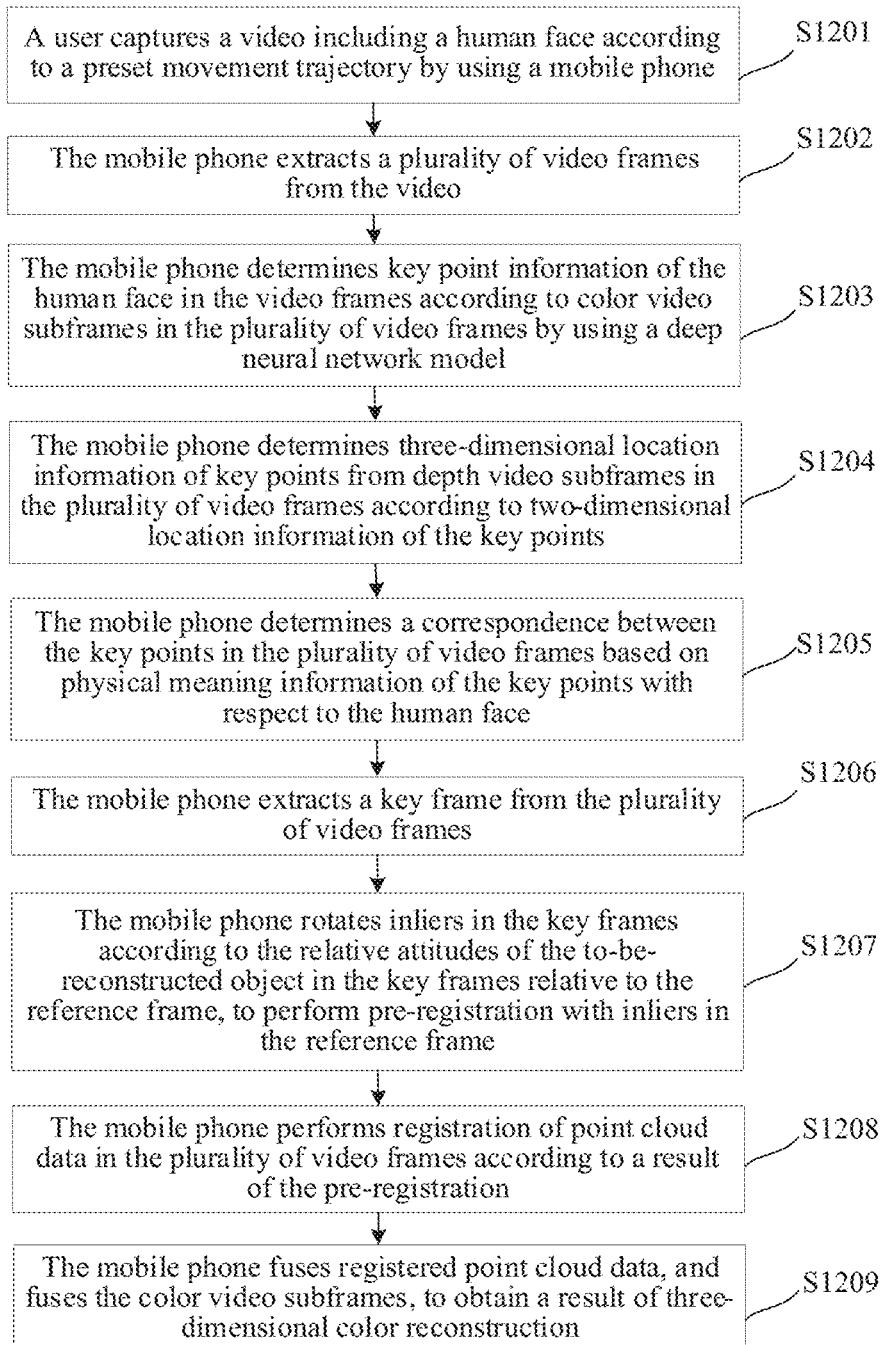
FIG. 12 is a flowchart of a three-dimensional object reconstruction method according to an embodiment of the disclosure.

Next, the three-dimensional object reconstruction method provided in the embodiments of the disclosure is described with reference to an actual application scenario. In the application scenario, the object is a human face, a terminal device is a mobile phone, and a person maintains still in a photographing process as far as possible. Referring to FIG. 12, the method includes the following operations:

S1201. A user captures a video including a human face according to a preset movement trajectory by using a mobile phone.

S1202. The mobile phone extracts a plurality of video frames from the video.

S1203. The mobile phone determines key point information of the human face in the video frames according to color video subframes in the plurality of video frames by using a deep neural network model.

S1204. The mobile phone determines three-dimensional location information of key points from depth video subframes in the plurality of video frames according to two-dimensional location information of the key points.

S1205. The mobile phone determines a correspondence between the key points in the plurality of video frames based on physical meaning information of the key points with respect to the human face.

S1206. The mobile phone extracts a key frame from the plurality of video frames.

S1207. The mobile phone rotates inliers in the key frames according to the relative attitudes of the object in the key frames relative to the reference frame, to perform pre-registration with inliers in the reference frame.

S1208. The mobile phone performs registration of point cloud data in the plurality of video frames according to a result of the pre-registration.

S1209. The mobile phone fuses registered point cloud data, and fuses the color video subframes, to obtain a result of three-dimensional color reconstruction.

Figure 13A:
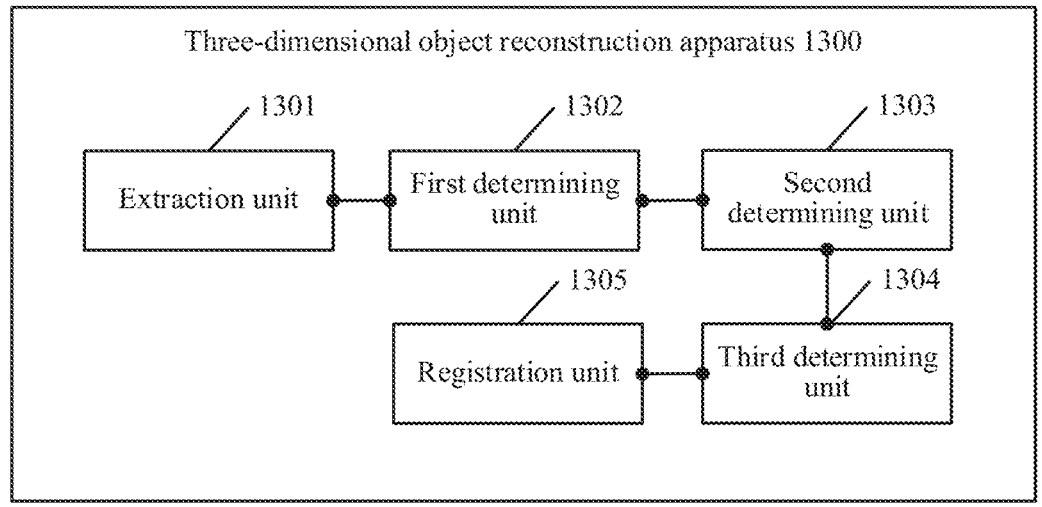
FIG. 13a is a structural diagram of a three-dimensional object reconstruction apparatus according to an embodiment of the disclosure.

Based on the three-dimensional object reconstruction method provided in the foregoing embodiments, an embodiment of the disclosure further provides a three-dimensional object reconstruction apparatus. The apparatus has the function of implementing the foregoing method embodiment, and the function may be implemented by hardware or may be implemented by hardware executing corresponding software. The apparatus may be the terminal device or the server described in the above, or may be disposed in a terminal device or a server. Referring to FIG. 13a, the apparatus including an extraction unit 1301, a first determining unit 1302, a second determining unit 1303, a third determining unit 1304, and a registration unit 1305.

The extraction unit 1301 is configured to obtain a plurality of video frames of an object, any one of the video frames including a color video subframe and a depth video subframe, The first determining unit 1302 is configured to determine key point information of the object in each of the video frames according to the color video subframes, the key point information including two-dimensional location information of key points and physical meaning information of the key points with respect to the object.

The second determining unit 1303 is configured to determine three-dimensional location information of the key points from the depth video subframes according to the two-dimensional location information of the key points.

The third determining unit 1304 is configured to determine a correspondence between the key points in the plurality of video frames based on the physical meaning information of the key points with respect to the object, the correspondence being used for identifying key points having the same physical meaning information in the plurality of video frames.

The registration unit 1305 is configured to perform registration of point cloud data in the plurality of video frames according to the correspondence between the key points and the three-dimensional location information of the key points, and generate a three-dimensional object of the object.

In an example embodiment, the first determining unit 1302 is configured to:

perform object detection on the color video subframe by using a first network model, and determine, in the color video subframe, a target region in which the object is located; and extract video frame data of the target region, and determine the key point information of the object in the video frame by using a second network model.

Figure 13B:
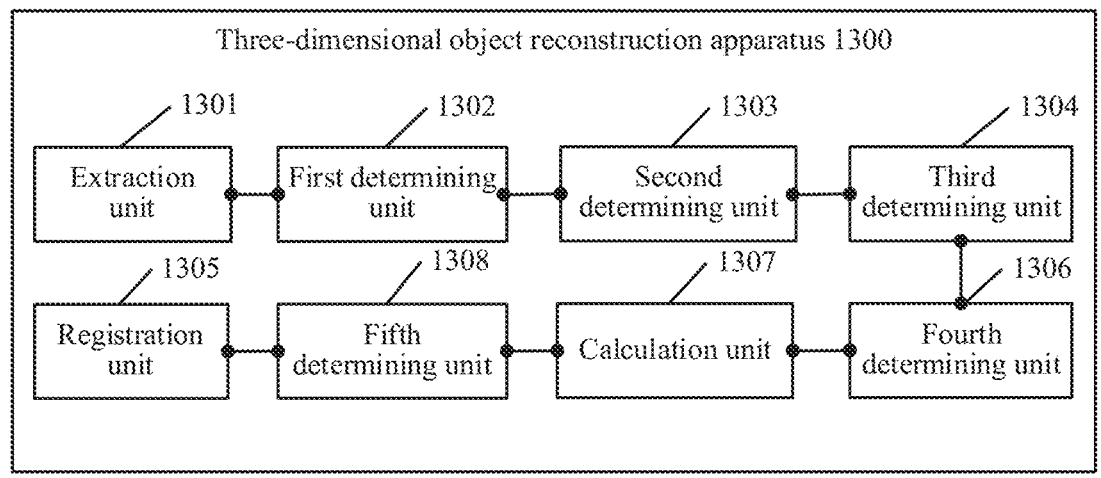
FIG. 13b is a structural diagram of a three-dimensional object reconstruction apparatus according to an embodiment of the disclosure.

In an example embodiment, referring to FIG. 13b, the apparatus further includes a fourth determining unit 1306, a calculation unit 1307, and a fifth determining unit 1308.

The fourth determining unit 1306 is configured to determine a reference frame and non-reference frames from the plurality of video frames.

The calculation unit 1307 is configured to calculate relative attitudes of the object in the non-reference frames relative to the reference frame, and calculate a quantity of key points matched as inliers in each of the non-reference frames.

The fifth determining unit 1308 is configured to determine at least one non-reference frame in each attitude range as a key frame according to the quantities of inliers in the non-reference frames in a plurality of attitude ranges obtained according to the relative attitudes of the object in the non-reference frames.

The registration unit 1305 is configured to:

perform registration of the point cloud data in the plurality of video frames according to the correspondence between the key points and three-dimensional location information of inliers in the reference frame and the key frames.

In an example embodiment, the fifth determining unit 1308 is configured to:

set a weight for each of the key points according to the physical meaning information of the key points, a weight of a key point whose physical meaning information reflects a deformable feature being greater than a weight of a key point whose physical meaning information reflects a non-deformable feature;

determine inlier scores of the non-reference frames based on the weights of the inliers and the quantities of inliers in the non-reference frames; and determine at least one non-reference frame as the key frame in each attitude range according to the inlier scores of the non-reference frames.

In an example embodiment, the registration unit 1305 is configured to:

rotate the inliers in the key frames according to the relative attitudes of the object in the key frames relative to the reference frame, to perform pre-registration with the inliers in the reference frame; and perform registration of the point cloud data in the plurality of video frames according to a result of the pre-registration.

In an example embodiment, the fifth determining unit 1308 is configured to:

determine an angle range in a horizontal direction according to the relative attitudes of the object in the non-reference frames; and divide the angle range into the plurality of attitude ranges according to an angle threshold.

It can be seen from the foregoing technical solutions that the plurality of video frames of the object are obtained, any one of the video frames including the color video subframe and the depth video subframe. The key point information of the object in each of the video frames is determined according to the color video subframes, the key point information including the two-dimensional location information of the key points and the physical meaning information of the key points with respect to the object. The physical meaning information may reflect a specific position on the object reflected by a key point in any one of the video frames. Therefore, the correspondence between the key points in the plurality of video frames may be determined based on the physical meaning information of the key points with respect to the object, so as to indicate which key points in the plurality of video frames have the same physical meaning information. Therefore, after the three-dimensional location information of key points in each video frame is determined by using the depth video subframe, the registration of point cloud data in the plurality of video frames may be performed efficiently according to the correspondence between the key points and the three-dimensional location information of the key points, which not only reduces the amount of computation, but also has high accuracy, achieving a better three-dimensional object reconstruction effect.

Figure 14A:
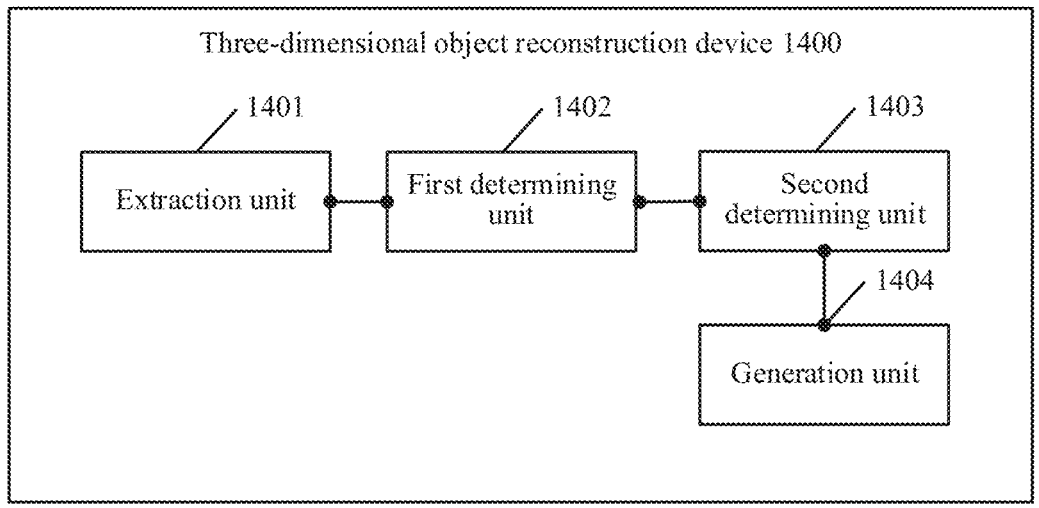
FIG. 14a is a structural diagram of a three-dimensional object reconstruction apparatus according to an embodiment of the disclosure.

An embodiment of the disclosure further provides a three-dimensional object reconstruction apparatus. The apparatus has the function of implementing the foregoing method embodiment, and the function may be implemented by hardware or may be implemented by hardware executing corresponding software. The apparatus may be the terminal device or the server described in the above, or may be disposed in a terminal device or a server. Referring to FIG. 14a, the apparatus includes an extraction unit 1401, a first determining unit 1402, a second determining unit 1403, and a generation unit 1404.

The extraction unit 1401 is configured to obtain a plurality of video frames of an object.

The first determining unit 1402 is configured to determine three-dimensional location information of key points of the object in the plurality of video frames and physical meaning information of the key points with respect to the object according to the plurality of video frames.

The second determining unit 1403 is configured to determine a correspondence between the key points in the plurality of video frames based on the physical meaning information of the key points with respect to the object, the correspondence being used for identifying key points having the same physical meaning information in the plurality of video frames.

The generation unit 1404 is configured to generate a three-dimensional object of the object according to the correspondence between the key points and the three-dimensional location information of the key points.

Figure 14B:
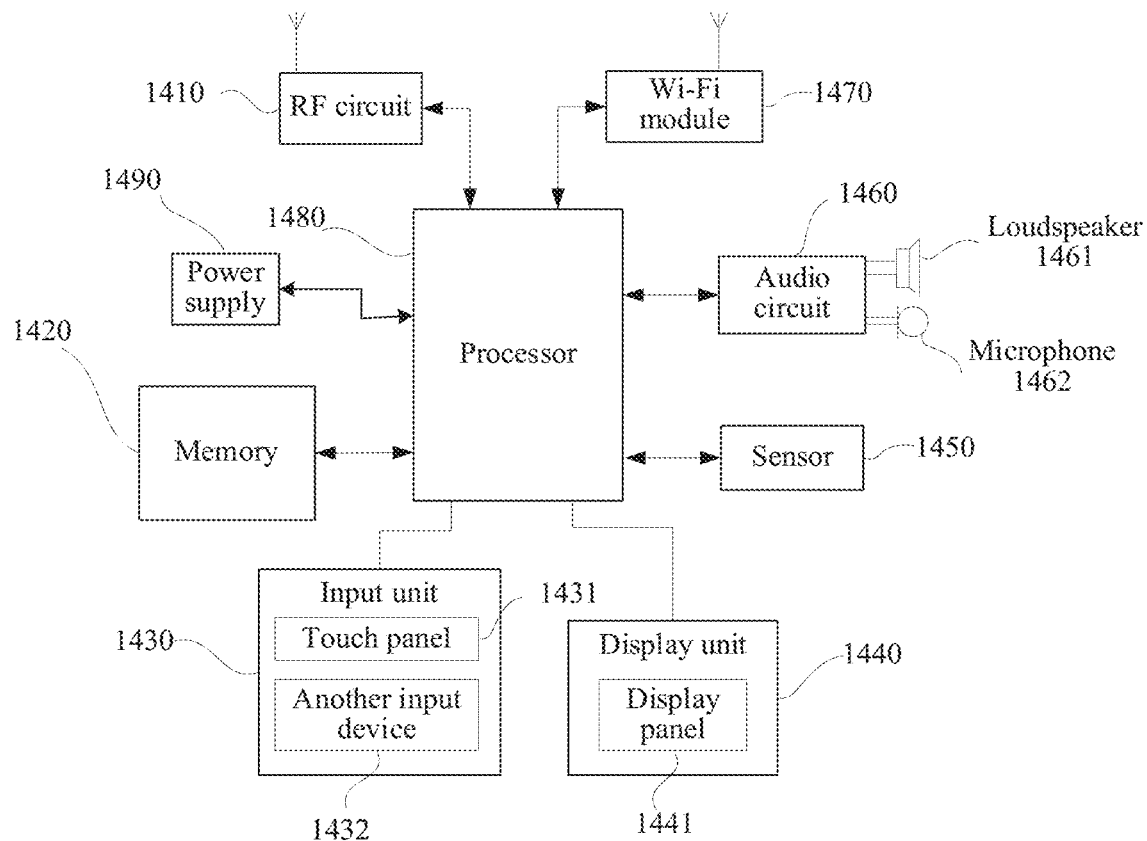
FIG. 14b is a structural diagram of a terminal device according to an embodiment of the disclosure.

An embodiment of the disclosure further provides a three-dimensional object reconstruction device. The three-dimensional object reconstruction device is described below with reference to the accompanying drawings. Referring to FIG. 14b, an embodiment of the disclosure provides a device 1400 for three-dimensional object reconstruction. The device 1400 may be a terminal device, and the terminal device may be any smart terminal such as a mobile phone, a tablet computer, a personal digital assistant (PDA), a point of sales (POS), or an in-vehicle computer. An example in which the terminal device is a mobile phone is used.

FIG. 14b is a block diagram of a structure of a part of a mobile phone related to a terminal device according to an embodiment of the disclosure. Referring to FIG. 14b, the mobile phone includes components such as: a radio frequency (RF) circuit 1410, a memory 1420, an input unit 1430, a display unit 1440, a sensor 1450, an audio circuit 1460, a wireless fidelity (Wi-Fi) module 1470, a processor 1480, and a power supply 1490. A person skilled in the art would understand that the structure of the mobile phone shown in FIG. 14b does not constitute a limitation on the mobile phone, and the mobile phone may include more components or fewer components than those shown in the figure, or some components may be combined, or a different component deployment may be used.

The following describes components of the mobile phone in detail with reference to FIG. 14b.

The RF circuit 1410 may be configured to receive and send signals during an information receiving or sending process or a call process. In an embodiment, the RF circuit 1410 receives downlink information from a base station, then delivers the downlink information to the processor 1480 for processing, and sends designed uplink data to the base station. Generally, the RF circuit 1410 includes, but is not limited to, an antenna, at least one amplifier, a transceiver, a coupler, a low noise amplifier (LNA), a duplexer, and the like. In addition, the RF circuit 1410 may also communicate with a network and another device through wireless communication. The wireless communication may use any communication standard or protocol, including, but not limited to a Global System for Mobile communications (GSM), a general packet radio service (GPRS), code division multiple access (CDMA), wideband code division multiple access (WCDMA), Long Term Evolution (LTE), an email, a short messaging service (SMS), and the like.

The memory 1420 may be configured to store a software program and a module, and the processor 1480 runs the software program and the module that are stored in the memory 1420, to implement various functional applications and data processing of the mobile phone. The memory 1420 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 1420 may include a high speed random access memory, and may also include a non-volatile memory, for example, at least one magnetic disk storage device, a flash memory, or another volatile solid-state storage device.

The input unit 1430 may be configured to receive input digit or character information, and generate a keyboard signal input related to the user setting and function control of the mobile phone. The input unit 1430 may include a touch panel 1431 and another input device 1432. The touch panel 1431, which may also be referred to as a touch screen, may collect a touch operation of a user on or near the touch panel 1431 (such as an operation of a user on the touch panel 1431 or near the touch panel 1431 by using any suitable object or accessory such as a finger or a stylus), and drive a corresponding connection apparatus according to a preset program. Optionally, the touch panel 1431 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 1480. Moreover, the touch controller may receive and execute a command transmitted from the processor 1480. In addition, the touch panel 1431 may be implemented by using various types, such as a resistive type, a capacitive type, an infrared type, and a surface acoustic wave type. In addition to the touch panel 1431, the input unit 1430 may further include the another input device 1432. The another input device 1432 may include, but is not limited to, one or more of a physical keyboard, a functional key (such as a volume control key or a switch key), a track ball, a mouse, and a joystick.

The display unit 1440 may be configured to display information inputted by the user or information provided for the user, and various menus of the mobile phone. The display unit 1440 may include a display panel 1441. Optionally, the display panel 1441 may be configured in the form of a liquid crystal display (LCD), an organic light-emitting diode (OLED), or the like. Further, the touch panel 1431 may cover the display panel 1441. After detecting a touch operation on or near the touch panel, the touch panel 1431 transfers the operation to the processor 1480 to determine a touch event type. Then the processor 1480 provides corresponding visual output on the display panel 1441 according to the touch event type. Although in FIG. 14*b*, the touch panel 1431 and the display panel 1441 are used as two separate parts to implement input and output functions of the mobile phone, in some embodiments, the touch panel 1431 and the display panel 1441 may be integrated to implement the input and output functions of the mobile phone.

The mobile phone may further include at least one sensor 1450 such as an optical sensor, a motion sensor, and other sensors. The optical sensor may include an ambient light sensor and a proximity sensor, where the ambient light sensor may adjust luminance of the display panel 1441 according to the luminance of the ambient light, and the proximity sensor may switch off the display panel 1441 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1460, a loudspeaker 1461, and a microphone 1462 may provide audio interfaces between the user and the mobile phone. The audio circuit 1460 may convert received audio data into an electrical signal and transmit the electrical signal to the loudspeaker 1461. The loudspeaker 1461 converts the electrical signal into a sound signal for output. On the other hand, the microphone 1462 converts a collected sound signal into an electrical signal. The audio circuit 1460 receives the electrical signal, converts the electrical signal into audio data, and outputs the audio data to the processor 1480 for processing. Then, the processor 1480 sends the audio data to, for example, another mobile phone by using the RF circuit 1410, or outputs the audio data to the memory 1420 for further processing.

Wi-Fi is a short distance wireless transmission technology. The mobile phone may assist, by using the Wi-Fi module 1470, a user to receive and transmit an email, browse a web page, access stream media, and the like. This provides wireless broadband Internet access for the user. Although FIG. 14*b* shows the Wi-Fi module 1470, it would be understood that the Wi-Fi module is not a necessary component of the mobile phone, and the Wi-Fi module may be omitted as required provided that the scope of the essence of the present disclosure is not changed.

The processor 1480 is a control center of the mobile phone, and is connected to various parts of the entire mobile phone by using various interfaces and lines. By running or executing a software program and/or module stored in the memory 1420, and invoking data stored in the memory 1420, the processor 1480 executes various functions of the mobile phone and performs data processing, thereby monitoring the entire mobile phone. Optionally, the processor 1480 may include one or more processing units. The processor 1480 may integrate an application processor and a modem. The application processor mainly processes an operating system, a user interface, an application program, and the like. The modem mainly processes wireless communication. It would be understood that alternatively, the modem processor may not be integrated into the processor 1480.

The mobile phone further includes the power supply 1490 (such as a battery) for supplying power to the components. The power supply may be logically connected to the processor 1480 by using a power management system, thereby implementing functions such as charging management, discharging management, and power consumption management by using the power management system.

Although not shown in the figure, the mobile phone may further include a camera, a Bluetooth module, and the like, and details are not further described herein.

In this embodiment, the processor 1480 included in the terminal device further has the following function: by running or executing the software program and/or module stored in the memory 1420, the processor 1480 implements the foregoing three-dimensional object reconstruction method.

Figure 15:
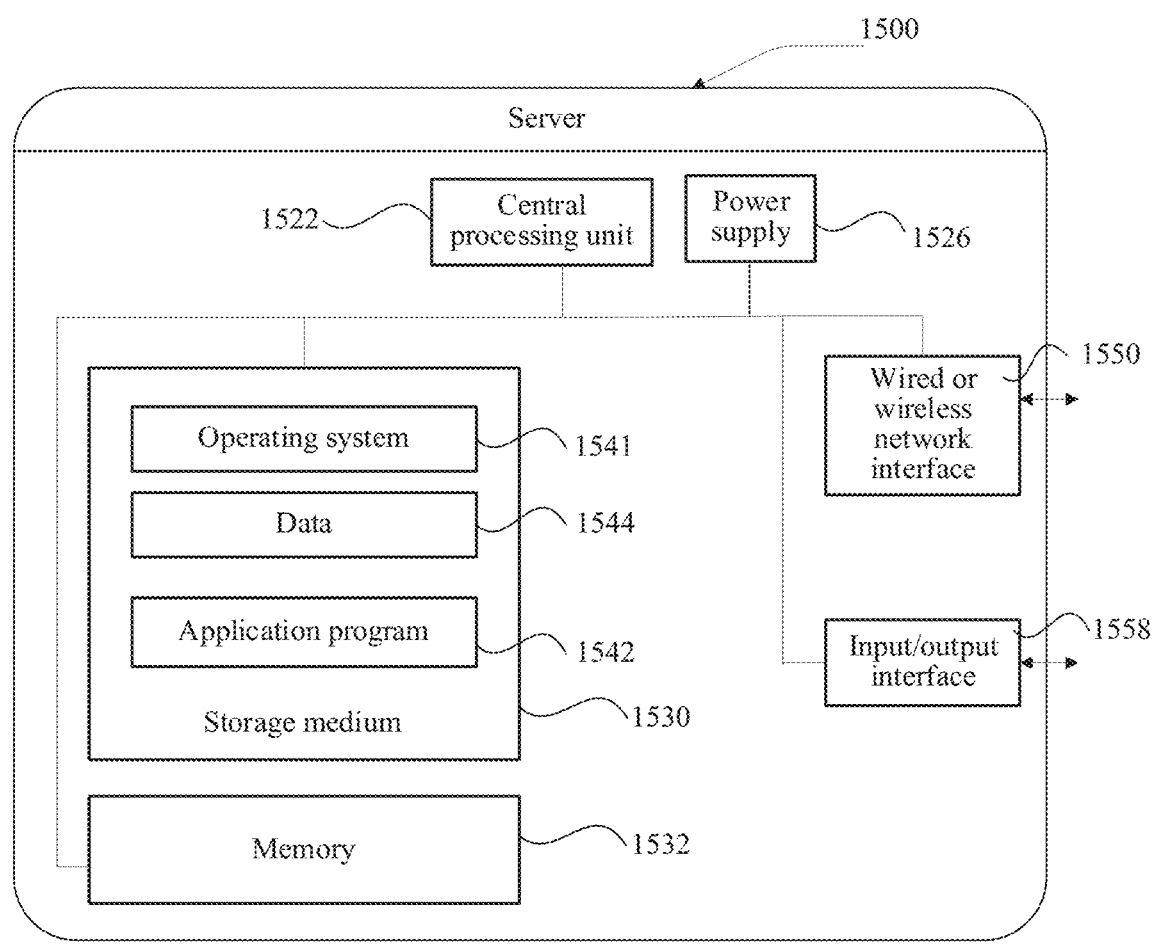
FIG. 15 is a structural diagram of a server according to an embodiment of the disclosure.

A three-dimensional object reconstruction device provided in this embodiment of the disclosure may be a server. FIG. 15 is a structural diagram of a server 1500 according to an embodiment of the disclosure. The server 1500 may be greatly different according to different configurations or performance, and may include one or more central processing units (CPU) 1522 (for example, one or more processors), a memory 1532, and one or more storage media 1530 (for example, one or more mass storage devices) for storing an application program 1542 or data 1544. The memory 1532 and the storage medium 1530 may implement transient storage or permanent storage. The program stored in the storage medium 1530 may include one or more modules (not shown in the figure), and each module may include a series of instruction operations on the server. Still further, the central processing unit 1522 may be configured to communicate with the storage medium 1530 to perform the series of instruction operations in the storage medium 1530 on the server 1500.

The server 1500 may further include one or more power supplies 1526, one or more wired or wireless network interfaces 1550, one or more input/output interfaces 1558, and/or one or more operating systems 1541 such as Windows Server™, Mac OS X™, Unix™, Linux™, or FreeBSD™.

The operations performed by the server in the foregoing embodiments may be based on the server structure shown in FIG. 15.

The CPU 1522 is configured to perform a series of instructions and operations in the storage medium 1530, to implement the foregoing three-dimensional object reconstruction method.

The terms "first", "second", "third", "fourth", and the like (if any) in the specification of the disclosure and the foregoing accompanying drawings are used for distinguishing similar objects, and are not necessarily used for describing a particular sequence or order. Data used in this way is interchangeable in a suitable case, so that the embodiments of the disclosure described herein may be implemented in a sequence in addition to the sequence shown or described herein. Moreover, the terms "include", "contain" and any other variants mean to cover the non-exclusive inclusion. For example, a process, method, system, product, or device that includes a list of operations or units is not necessarily limited to those operations or units, but may include other operations or units not expressly listed or inherent to such a process, method, product, or device.

In the disclosure, "at least one (item)" refers to one or more and "a plurality of" refers to two or more. "And/or" is used to describe an association between associated objects, and indicates that there may be three types of relationships. For example, "A and/or B" may indicate that only A exists, only B exists, and both A and B exist, where A and B may be singular or plural. The character "/" generally indicates an "or" relationship between the associated objects. "At least one of the following" or a similar expression thereof refers to any combination of these items, including one item or any combination of more items. For example, at least one of a, b, or c may indicate: a, b, c, "a and b", "a and c", "b and c", or "a, b, and c", where a, b, and c may be singular or plural.

In the embodiments provided in the disclosure, the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one position or may be distributed over a plurality of network units. Some or all of the units may be selected according to actual needs to achieve the objectives of the solutions of the embodiments.

In addition, functional units in the embodiments of the disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or the part contributing to the related art, or all or some of the technical solutions may be implemented in the form of a software product. The computer software product is stored in a storage medium and includes several instructions for instructing a computer device (which may be a personal computer, a server, a network device, or the like) to perform all or some of the operations of the methods described in the embodiments of the disclosure. The foregoing storage medium includes various media capable of storing program codes, such as, a USB flash drive, a mobile hard disk, a Read Only Memory (ROM), a Random Access Memory (RAM), a magnetic disk, or an optical disc.

As described above, according to the technical solutions provided by the example embodiments of the disclosure, a plurality of video frames of an object are obtained, each of the video frames including a color video subframe and a depth video subframe. Key point information of the object in each of the video frames is determined according to the color video subframes, the key point information including two-dimensional location information of key points and physical meaning information of the key points with respect to the object. Physical meaning information may reflect a specific position on the object reflected by a key point in any one of the video frames (that is, indicating respective parts of the object). Therefore, a correspondence between the key points in the plurality of video frames may be determined based on physical meaning information of the key points with respect to the object, so as to indicate which key points in the plurality of video frames have the same physical meaning information. Therefore, after three-dimensional location information of key points in each video frame is determined by using the depth video subframe, registration of point cloud data in the plurality of video frames may be performed efficiently according to the correspondence between the key points and the three-dimensional location information of key points, which not only reduces the amount of computation, but also has high accuracy, achieving a better three-dimensional object reconstruction effect.

The foregoing embodiments are merely intended for describing the technical solutions of the disclosure, but not for limiting the disclosure. Although the disclosure is described in detail with reference to the foregoing embodiments, a person of ordinary skill in the art may understand that they may still make modifications to the technical solutions described in the foregoing embodiments or make equivalent replacements to some technical features thereof, without departing from the spirit and scope of the technical solutions of the embodiments of the disclosure.

What is claimed is:

1. A three-dimensional object reconstruction method, applied to a terminal device or a server, the method comprising:
    obtaining a plurality of video frames of an object;
    determining three-dimensional location information of key points of the object in the plurality of video frames and physical meaning information of the key points, the physical meaning information indicating respective positions of the object;
    determining a correspondence between the key points having the same physical meaning information in the plurality of video frames; and
    generating a three-dimensional object according to the correspondence and the three-dimensional location information of the key points,
    wherein the plurality of video frames comprises a reference frame and non-reference frames, and the method further comprises determining key frames among the non-reference frames based on a quantity of key points, included in each key frame, that are matched as inliers with key points in the reference frame, and further based on weights of the inliers,
    wherein the weights of the inliers are applied such that a greater weight is applied to a key point whose physical meaning information reflects a deformable feature and a lower weight is applied to a key point whose physical meaning information reflects a non-deformable feature, and
    wherein the generating the three-dimensional object comprises generating the three-dimensional object according to the correspondence and three-dimensional location information of inliers in the reference frame and the key frames.

2. The method according to claim 1, wherein each of the plurality of video frames comprises a color video subframe and a depth video subframe,
    the method further comprises determining key point information of the object in the plurality of video frames according to color video subframes of the plurality of video frames, the key point information comprising two-dimensional location information of key points of the object and the physical meaning information of the key points, and
    the determining the three-dimensional location information of the key points comprises determining the three-dimensional location information of the key points of the object in the plurality of video frames from depth video subframes of the plurality of video frames according to the two-dimensional location information of the key points.

3. The method according to claim 2, wherein the determining the key point information comprises:
    performing object detection on the color video subframe of a video frame by using a first network model, and determining, in the color video subframe, a target region in which the object is located; and
    extracting video frame data of the target region, and determining the key point information of the object in the video frame by using a second network model.

4. The method according to claim 2, wherein the generating the three-dimensional object comprises performing registration of point cloud data in the plurality of video frames according to the correspondence and the three-dimensional location information of the key points, and generating the three-dimensional object based on the registration of the point cloud data.

5. The method according to claim 4, wherein the determining the key frames comprises:
    obtaining relative attitudes of the object in the non-reference frames relative to the reference frame, and obtaining a quantity of key points matched as inliers in each of the non-reference frames; and
    determining, for each attitude range of a plurality of attitude ranges, at least one non-reference frame as a key frame according to quantities of inliers in the non-reference frames, the plurality of attitude ranges being obtained according to the relative attitudes of the object in the non-reference frames; and
    the performing the registration of the point cloud data comprises:
    performing the registration of the point cloud data in the plurality of video frames according to the correspondence and the three-dimensional location information of inliers in the reference frame and the key frames.

6. The method according to claim 5, wherein the determining the key frames further comprises:
    determining inlier scores of the non-reference frames based on the weights of the inliers and the quantities of inliers in the non-reference frames; and
    determining the at least one non-reference frame as the key frame in each attitude range according to the inlier scores of the non-reference frames.

7. The method according to claim 5, wherein the performing the registration of the point cloud data in the plurality of video frames according to the correspondence and the three-dimensional location information of inliers in the reference frame and the key frames comprises:
    rotating the inliers in the key frames according to the relative attitudes of the object in the key frames relative to the reference frame, to perform pre-registration with the inliers in the reference frame; and performing the registration of the point cloud data in the plurality of video frames according to a result of the pre-registration.

8. The method according to claim 5, wherein the plurality of attitude ranges are obtained by:
   determining an angle range in a horizontal or vertical direction covering the relative attitudes of the object in the non-reference frames; and
   dividing the angle range into the plurality of attitude ranges by using an angle threshold.

9. A three-dimensional object reconstruction apparatus, comprising:
   at least one memory configured to store program code; and
   at least one processor configured to read the program code and operate as instructed by the program code, the program code including:
      video frame obtaining code configured to cause the at least one processor to obtain a plurality of video frames of an object;
      first determining code configured to cause the at least one processor to determine three-dimensional location information of key points of the object in the plurality of video frames and physical meaning information of the key points, the physical meaning information indicating respective positions of the object;
      second determining code configured to cause the at least one processor to determine a correspondence between the key points having the same physical meaning information in the plurality of video frames; and
      generation code configured to cause the at least one processor to generate a three-dimensional object according to the correspondence and the three-dimensional location information of the key points,
   wherein the plurality of video frames comprises a reference frame and non-reference frames, and the program code comprises third determining code configured to cause the at least one processor to determine key frames among the non-reference frames based on a quantity of key points, included in each key frame, that are matched as inliers with key points in the reference frame, and further based on weights of the inliers,
   wherein the weights of the inliers are applied such that a greater weight is applied to a key point whose physical meaning information reflects a deformable feature and a lower weight is applied to a key point whose physical meaning information reflects a non-deformable feature, and
   wherein the generation code is configured to cause the at least one processor to generate the three-dimensional object comprises generating the three-dimensional object according to the correspondence and three-dimensional location information of inliers in the reference frame and the key frames.

10. The apparatus according to claim 9, wherein each of the plurality of video frames comprises a color video subframe and a depth video subframe,
   the program code further comprises:
      fourth determining code configured to cause the at least one processor to determine key point information of the object in the plurality of video frames according to color video subframes of the plurality of video frames, the key point information comprising two-dimensional location information of key points of the object and the physical meaning information of the key points,
   wherein the first determining code is further configured to cause the at least one processor to determine three-dimensional location information of the key points of the object in the plurality of video frames from depth video subframes of the plurality of video frames according to the two-dimensional location information of the key points.

11. The apparatus according to claim 10, wherein the fourth determining code comprises:
   object detection subcode configured to cause the at least one processor to perform object detection on the color video subframe of a video frame by using a first network model, and determine, in the color video subframe, a target region in which the object is located; and
   extraction subcode configured to cause the at least one processor to extract video frame data of the target region, and determine the key point information of the object in the video frame by using a second network model.

12. The apparatus according to claim 10, wherein the generation code is further configured to cause the at least one processor to perform registration of point cloud data in the plurality of video frames according to the correspondence and the three-dimensional location information of the key points, and generate the three-dimensional object based on the registration of the point cloud data.

13. The apparatus according to claim 12, wherein the program code further comprises,
   obtaining code configured to cause the at least one processor to obtain relative attitudes of the object in the non-reference frames relative to the reference frame, and obtain a quantity of key points matched as inliers in each of the non-reference frames, and
   fifth determining code configured to cause the at least one processor to determine, for each attitude range of a plurality of attitude ranges, at least one non-reference frame as a key frame according to quantities of inliers in the non-reference frames, the plurality of attitude ranges being obtained according to the relative attitudes of the object in the non-reference frames; and
   registration code configured to cause the at least one processor to perform the registration of the point cloud data in the plurality of video frames according to the correspondence and the three-dimensional location information of inliers in the reference frame and the key frames.

14. The apparatus according to claim 13, wherein the fifth determining code comprises:
   inlier score determining subcode configured to cause the at least one processor to determine inlier scores of the non-reference frames based on the weights of the inliers and the quantities of inliers in the non-reference frames; and
   key frame determining subcode configured to cause the at least one processor to determine the at least one non-reference frame as the key frame in each attitude range according to the inlier scores of the non-reference frames.

15. The apparatus according to claim 13, wherein the registration code is further configured to cause the at least one processor to:
   rotate the inliers in the key frames according to the relative attitudes of the object in the key frames relative to the reference frame, to perform pre-registration with the inliers in the reference frame; and perform the registration of the point cloud data in the plurality of video frames according to a result of the pre-registration.

16. The apparatus according to claim 13, wherein the plurality of attitude ranges are obtained by:

determining an angle range in a horizontal or vertical direction covering the relative attitudes of the object in the non-reference frames; and dividing the angle range into the plurality of attitude ranges by using an angle threshold.

17. A non-transitory computer-readable storage medium, configured to store program code executable by at least one processor to cause the at least one processor to perform:

obtaining a plurality of video frames of an object;

determining three-dimensional location information of key points of the object in the plurality of video frames and physical meaning information of the key points, the physical meaning information indicating respective positions of the object;

determining a correspondence between the key points having the same physical meaning information in the plurality of video frames; and generating a three-dimensional object according to the correspondence and the three-dimensional location information of the key points, wherein the plurality of video frames comprises a reference frame and non-reference frames, and the program code further causes the at least one processor to determine key frames among the non-reference frames based on a quantity of key points, included in each key frame, that are matched as inliers with key points in the reference frame, and further based on weights of the inliers, wherein the weights of the inliers are applied such that a greater weight is applied to a key point whose physical meaning information reflects a deformable feature and a lower weight is applied to a key point whose physical meaning information reflects a non-deformable feature, and wherein the generating the three-dimensional object comprises generating the three-dimensional object according to the correspondence and three-dimensional location information of inliers in the reference frame and the key frames.

* * * * *